US010776432B2

(12) United States Patent
Volach

(10) Patent No.: US 10,776,432 B2
(45) Date of Patent: Sep. 15, 2020

(54) CONTENT SHARING MANAGEMENT

(71) Applicant: PECAN TECHNOLOGIES INC, Tortola (VG)

(72) Inventor: Ben Volach, London (GB)

(73) Assignee: PECAN TECHNOLOGIES INC, Tortola (VG)

( * ) Notice: Subject to any disclaimer, the term of this patent is extended or adjusted under 35 U.S.C. 154(b) by 235 days.

(21) Appl. No.: 14/766,352

(22) PCT Filed: Feb. 6, 2014

(86) PCT No.: PCT/IB2014/058835
§ 371 (c)(1),
(2) Date: Aug. 6, 2015

(87) PCT Pub. No.: WO2014/122606
PCT Pub. Date: Aug. 14, 2014

(65) Prior Publication Data
US 2015/0370909 A1 Dec. 24, 2015

Related U.S. Application Data

(60) Provisional application No. 61/762,029, filed on Feb. 7, 2013.

(51) Int. Cl.
*G06F 16/00* (2019.01)
*G06F 16/9535* (2019.01)
(Continued)

(52) U.S. Cl.
CPC .... *G06F 16/9535* (2019.01); *G06F 16/24575* (2019.01); *G06Q 30/0269* (2013.01);
(Continued)

(58) Field of Classification Search
CPC ......... G06F 17/30321; G06F 17/30286; G06F 17/30312; G06F 16/9535; G06F 16/24575; H04L 65/403
(Continued)

(56) References Cited

U.S. PATENT DOCUMENTS

2008/0154967 A1 6/2008 Heikes et al.
2009/0172127 A1* 7/2009 Srikanth ................ G06Q 30/00
709/217
(Continued)

FOREIGN PATENT DOCUMENTS

WO 2004/046874 6/2004
WO 2009/114204 9/2009

OTHER PUBLICATIONS

Saint-Andre, XEP-0071:XHTML-IM, http://xmpp.org/extensions/xep-0071.html, pp. 1-31, Nov. 28, 2012.
(Continued)

*Primary Examiner* — Monica M Pyo
(74) *Attorney, Agent, or Firm* — Browdy and Neimark, PLLC

(57) ABSTRACT

The presently disclosed subject matter includes a system, a method and a program storage device which enable to add selectivity to content sharing between users of communication networks. When a sender indicates a desire to share content, information with respect to the suggested content item (i.e. the content item intended to be shared) and information with respect to the sharing profile of one or more respective target recipients is analyzed. A recommendation is provided as whether or not it is suggested to the sender to perform an action. For example, the recommendation can be indicative as to whether or not it is recommended to share a given content item with a given recipient.

19 Claims, 9 Drawing Sheets

(51) Int. Cl.
*G06F 16/2457* (2019.01)
*G06Q 30/06* (2012.01)
*H04L 29/08* (2006.01)
*H04N 21/4788* (2011.01)
*H04N 21/466* (2011.01)
*G06Q 30/02* (2012.01)
*H04L 29/06* (2006.01)

(52) U.S. Cl.
CPC ....... *G06Q 30/0631* (2013.01); *H04L 65/403* (2013.01); *H04L 67/22* (2013.01); *H04L 67/306* (2013.01); *H04N 21/4668* (2013.01); *H04N 21/4788* (2013.01)

(58) Field of Classification Search
USPC ......................................... 707/722, 713, 726
See application file for complete search history.

(56) References Cited

U.S. PATENT DOCUMENTS

| | | | |
|---|---|---|---|
| 2009/0234876 A1 | 9/2009 | Schigel et al. | |
| 2010/0153411 A1* | 6/2010 | Toebes | G06F 16/9535 707/758 |
| 2010/0287033 A1* | 11/2010 | Mathur | G06F 17/30867 705/319 |
| 2011/0276563 A1* | 11/2011 | Sandoval | H04L 63/102 707/723 |
| 2012/0030586 A1* | 2/2012 | Ketkar | G06F 17/3089 715/751 |
| 2012/0030587 A1* | 2/2012 | Ketkar | G06F 17/30038 715/751 |
| 2012/0296978 A1 | 11/2012 | Inoue et al. | |
| 2014/0012918 A1* | 1/2014 | Chin | G06Q 50/01 709/204 |

OTHER PUBLICATIONS

Saint-Andre, Interworking between the Session Initiation Protocol (SIP) and the Extensible Messaging and Presence Protocol (XMPP): Core draft-saintandre-sip-xmpp-core-01, https://web.archive.org/web/20130302013928/http://tools.ietf.org/html/draft-saintandre-sip-xmpp-core-01, pp. 1-13, Sep. 9, 2009.

Saint-Andre, Interworking between the Session Initiation Protocol (SIP) and the Extensible Messaging and Presence Protocol (XMPP): Instant Messaging draft-saintandre-sip-xmpp-im-01, http://tools.ietf.org/html/draft-saintandre-sip-xmpp-im-01, pp. 1-22, Mar. 8, 2009.

Saint-Andre, Interworking between the Session Initiation Protocol (SIP) and the Extensible Messaging and Presence Protocol (XMPP): One-to-One Text Chat draft-saintandre-sip-xmpp-chat-03, http://tools/ietf/org/html/draft-saintandre-sip-xmpp-chat-03, pp. 1-82, Mar. 8, 2009.

Saint-Andre, Interworking between the Session Initiation Protocol (SIP) and the Extensible Messaging and Presence Protocol (XMPP): Presence draft-saintandre-sip-xmpp-presence-02, pp. 1-40, Mar. 8, 2009.

Thomas, Krista, Thomson Reuters Adds 'Social Tags' and Spanish Language Support to its OpenCalais Service, http://www.opencalais.com/press-releases/thomson-reuters-adds-%E2%80%98social-tags%E2%80%99-and-spanish-language-support-its-opencalais-servic, pp. 1-3, Jun. 14, 2009.

* cited by examiner

CONTENT SHARING MANAGEMENT

TECHNICAL FIELD

The presently disclosed subject matter relates to sharing content between different communication devices.

BACKGROUND

It is common practice for communication networks, which are used today, to provide content sharing functionalities. Email applications, text messaging applications, instant messaging application, different types of social networks such as Facebook and Twitter as well as other types of communication network applications all provide users with the ability to publish, in a given page of the network application, content that was created elsewhere.

Publications considered to be relevant as background to the presently disclosed subject matter are listed below. Acknowledgement of the publications herein is not to be inferred as meaning that these are in any way relevant to the patentability of the presently disclosed subject matter.

PCT Application Publication No. WO2009114204 teaches a system and method to enhance relevancy efficiency of content sharing within a meta-community through content recommendation and recipient recommendation. The systems and methods analyze sharing activities within the meta-community, both of members and of un-registered users through member sharing interactions, to create sharing preference profiles for members and un-registered users. The present invention also provides systems and methods for storing shared content and for monitoring web activities. The sharing preference profiles are used to provide content recommendations in which relevant content is selected from among content previously shared in the meta-community or content predicted as highly relevant to the sharing preference profiles of meta-community members.

PCT Application Publication No. WO2004046874 teaches sharing content that includes: classifying content perceived by a sharing user, determining a set of recipient candidates likely to be interested in the content based upon the classification of the content and prior sharing activity of the recipients with respect to content of the same or similar classification, and presenting to the sharing user one or more members of the set of recipient candidates for sharing the content being perceived by the sharing user.

US Application Publication No. 2008154967 teaches that a lead user may share an on-line media content experience with one or more followers by identifying content of interest being experienced on the lead user system, identifying one or more followers with whom to share the content of interest, inviting the followers to experience the content of interest, and enabling the followers to access the content of interest.

US Application Publication No. 2010287033 teaches that recommendations for content may be generated based on social networking communities. For example, a user may receive a list of recommended content items based on content that has been viewed by others in the user's social networks. Recommendations may further be based on content information such as reviews, ratings, tags, attributes and the like from various sources internal and external to the user's social networks. Content items may be given a weight that corresponds to a determined level of relevance or interest to a user. Using the weight, a list of recommended items may be sorted or filtered. In one or more configurations, the weight may be modified based on an age of the content item. For example, the relevance, importance or interest of a news report may decline as the news becomes older and older.

The full contents of the above publications are incorporated by reference herein where appropriate for the purpose of teachings of additional or alternative details, features and/or technical background.

The following are a number of examples of commonly known standards of messaging and presence service:

SIMPLE—Session Initiation Protocol for Instant Messaging and Presence standards' collection as referred to herein includes: RFC 2778, RFC 2779, RFC 3761, RFC 3762, RFC 3764, RFC 4725, RFC 3428, RFC 3856, RFC 3857, RFC 3858 and RFC 4825 available from the Internet Engineering Task Force (IETF) at http://tools.etf.org/html/

RFC 2045, RFC 2046, RFC 2047, RFC 4288, RFC 4289 RFC 2049 and RFC 2388 available from the Internet Engineering Task Force (IETF) at http://tools.ietf.org/html/

XMPP Standards Foundation—XEP-0071 XHTML-IM, http://xmpp.org/extensions/xep-0071.html;

XMPP-CORE-01 http://tools.ietf.org/html/draft-saintandre-XMPP-CORE-01;

SIP-XMPP-IM-01 http://tools.ietf.org/html/draft-saintandre-sip-xmpp-im-01;

SIP-XMPP-CHAT-03 http://tools.ietf.org/html/draft-saintandre-sip-xmpp-chat03;

XMPP-PRESENCE-02 http://tools.ietf.org/html/draft-saintandre-sip-xmpp-presence-02.

XMPP standards collections referred to herein include: RFC 3920, RFC 3921, RFC 3922, RFC 3923, RFC 4854, RFC 4974 and RFC 5122.

Open Mobile Alliance standards: Instant Messaging and Presence Service (IMPS), Presence & Availability (PAG) and Messaging (MWG).

GENERAL DESCRIPTION

According to one aspect of the presently disclosed subject matter there is provided a computerized method of sharing content between network entities connected over a communication network, the method comprising: with the help of a processor performing at least the following: receiving, from a given network entity, information indicative of a request to share at least one given content item; receiving, from the given network entity, information indicative of one or more selected target recipients; obtaining information characterizing said at least one given content item; obtaining for at least part of said one or more selected target recipients, information related to a respective sharing profile; and generating a recommendation with respect to the at least one given content item, based on said information related to a respective sharing profile and said information characterizing the at least one given content item; the recommendation being indicative as to whether or not to perform one or more actions with respect to at least one recipient of the one or more selected target recipients.

Additionally or alternatively to the above features, the method according to this aspect of the presently disclosed subject matter can optionally comprise one or more of features (i) to (xv) below, mutatis mutandis, in any desired combination or permutation:

i). wherein the one or more actions include sharing the at least one content item with at least one respective recipient of the one or more selected target recipients.

ii). wherein the request is made by the given network entity, the method further comprising: providing the recommendation to the given network entity.

iii). wherein the request is generated by a second network entity connected via the network to the given network entity; the information indicative of a request to share at least one given content item is communicated from the second network entity to the given network entity.

iv). wherein said given network entity is configured, in response to the recommendation, to determine whether or not to perform one or more actions based on a predefined decision logic.

v). wherein the method further comprising: responsive to receiving the request, obtaining at least one cached sharing profile of a group of at least one respective target recipient; generating a recommendation with respect to the at least one given content item, based on said at least one cached sharing profile and said information characterizing the at least one given content item; the recommendation being indicative as to whether or not to perform one or more actions with respect to the at least one respective target recipient in the group; and utilizing the recommendation, if any one of the at least respective target recipients in the list is identical to any one of the at least one selected target recipient.

vi). wherein the one or more actions include sharing alternative content with a respective recipient of the one or more selected recipients, in addition to or instead of the at least one content item.

vii). wherein the one or more selected target recipients include at least a first recipient and a second recipient, and wherein the recommendation comprises information indicative of one alternative content to be shared with the first recipient and information indicative of another alternative content to be shared with the second recipient.

viii). wherein the action is an alternative action, other than sharing the at least one content-item.

ix). wherein the method further comprising: obtaining external service data with respect to a given recipient of the one or more selected target recipients; and generating the recommendation, for the given recipient based on the external service data.

x). wherein the method further comprising: obtaining general information with respect to a given recipient of the one or more selected recipients; and generating the recommendation, for the given recipient based on the general information in addition or instead of the information related to a respective sharing profile.

xi). wherein the method further comprising: If the sharing profile information is unavailable, obtaining general information; and generating the recommendation based on the information characterizing the at least one given content and the general information.

xii). wherein said recommendation can be in one or more of the following forms: a plurality of individual recommendations, each recommendation referring to a respective target recipient; a plurality of individual recommendations, each recommendation referring to a respective content item; a comprehensive recommendation referring to a plurality of recipients; and a comprehensive recommendation referring to a plurality of content items.

xiii). wherein the method further comprising: responsive to receiving said recommendation, displaying the recommendation at the given network entity.

xiv). wherein the method further comprising: automatically proceeding with the sharing of the at least one content item according to the recommendation.

xv). wherein the one or more target recipients are part of a social graph of a first user of a social network, the recommendation is indicative whether it is advisable for the first to share a content item with at least part of the social graph.

xvi). wherein the sharing profile includes one or more of: personal information; sharing history; browsing history; presence information; and external service data.

According to another aspect of the presently disclosed subject there is provided a content sharing management device operatively connectible to communication network, the device comprising: non-transitory computer memory and at least one processor configured to: receive, from a given network entity, information indicative of a request to share at least one given content item; receive, from the given network entity, information indicative of one or more selected target recipients; obtain information characterizing said at least one given content item; obtain for at least part of said selected one or more recipients respective information related to a respective sharing profile; and generate a recommendation with respect to the at least one given content item, based on said information related to a respective sharing profile and said information characterizing the at least one given content item; the recommendation being indicative as to whether or not to perform one or more actions with respect to at least one recipient of the one or more selected target recipients.

Additionally or alternatively to the above features, the device, according to this aspect of the presently disclosed subject matter can optionally comprise one or more of features (i) to (xvi) below, mutatis mutandis, in any desired combination or permutation.

i). wherein the one or more actions include sharing the at least one content item with at least one respective recipient of the one or more selected recipients.

ii). wherein the request is made by the given network entity, the device is further configured to provide the recommendation to the given network entity.

iii). wherein the request is generated by a computer program running on a second network entity connected to the network; the computer program is not operable to communicate the information with respect to the request to the content sharing management device;

the second network entity is connected via the network to the given network entity and configured to communicate the information indicative of a request to share at least one given content item to the given network entity.

iv). wherein the recommendation is an initial recommendation; the at least one processor is further configured to provide the recommendation to a network entity; the network entity is configured to obtain additional information and provide a final recommendation based on the recommendation and the additional information.

v). wherein responsive to receiving the request the at least one processor is further configured: to obtain at least one cached information related to a respective sharing profile of a group of at least one respective target recipient;

generate a recommendation with respect to the at least one given content item, based on said at least one cached information related to a respective sharing profile and said information characterizing the at least one given content item; the recommendation being indicative as to whether or not to perform one or more actions with respect to the at least one respective target recipient in the group; and utilize the recommendation, if any one of the at least respective target recipients in the list is identical to any one of the at least one selected target recipient.

vi). wherein the information related to a respective sharing profile is stored at a data repository which is accessible to the device.

vii). wherein information related to a respective sharing profile is stored at a data repository which is accessible to a network entity which generated the request.

viii). wherein the one or more actions include sharing alternative content with a respective recipient of the one or more selected recipients, in addition to or instead of the at least one content item; the processor is further configured to identify alternative content and suggest the alternative content to a sender of the request.

ix). wherein the processor is further configured to suggest an alternative action, other than sharing the at least one content-item.

x). wherein the device is connected to a data source of external service data; the processor is further configured to obtain from the data source external service data with respect to a given recipient; and to generate the recommendation, for the given recipient based on the external service data.

xi). wherein the data source is a presence service.

xii). wherein the device is operatively connected to at least one data source for obtaining general information; the device being configured to generate the recommendation, for a given recipient based on the public information.

xiii). wherein the device is operatively connected to a data-repository designated for storing sharing profiles; the device is configured to obtain the information related to a respective sharing profile from the data repository.

xiv). wherein the device is operatively connected to a data-repository designated for information characterizing content items; the device is configured to obtain the information characterizing the at least one given content item from the data repository.

xv). wherein the device is implemented as a client device in said communication network.

xvi). wherein the device is implemented as a server device in said network.

xvii). wherein the device and the given network entity are consolidated in a single device.

xviii). wherein the request is generated by a computer program without the interaction of a human.

According to another aspect of the presently disclosed subject matter there is provided a computer program product implemented on a non-transitory computer useable medium having computer readable program code embodied therein for sharing content between network entities connected over a communication network, the computer program product comprising:

computer readable program code for causing the computer to receive, from a given network entity, information indicative of a request to share at least one given content item;

computer readable program code for causing the computer to receive, from the given network entity, information indicative of one or more selected target recipients;

computer readable program code for causing the computer to obtain information characterizing said at least one given content item;

computer readable program code for causing the computer to obtain for at least part of said selected one or more recipients information related to a respective sharing profile; and computer readable program code for causing the computer to generate a recommendation with respect to the at least one given content item, based on said information related to a respective sharing profile and said information characterizing the at least one given content item; the recommendation being indicative as to whether or not to perform one or more actions with respect to at least one recipient of the one or more selected target recipients.

According to another aspect of the presently disclosed subject matter there is provided a system comprising a plurality of network entities connected over a communication network, the network entities comprising computer memory and at least one processor; the system comprising:

at least a first client device, a second client device and a content sharing management server; the server is configured to receive, from the first client, information indicative of a request to share at least one given content item with the second client, the second client being a target recipient;

to obtain information characterizing said at least one given content item; obtain information related to a respective sharing profile with respect to the target recipient; and generate a recommendation with respect to the at least one given content item, based on said information related to a respective sharing profile and said information characterizing the at least one given content item; the recommendation being providing an indication to the first client as to whether or not to perform one or more actions with respect to the target recipient.

According to another aspect of the presently disclosed subject matter there is provided a non-transitory program storage device readable by machine, tangibly embodying a program of instructions executable by the machine to perform method for of sharing content between network entities connected over a communication network, the method comprising: receiving, from a given network entity, information indicative of a request to share at least one given content item; receiving, from the given network entity, information indicative of one or more selected target recipients; obtaining information characterizing said at least one given content item; obtaining for at least part of said one or more selected target recipients, information related to a respective sharing profile; and generating a recommendation with respect to the at least one given content item, based on said information related to a respective sharing profile and said information characterizing the at least one given content item; the recommendation being indicative as to whether or not to perform one or more actions with respect to at least one recipient of the one or more selected target recipients.

Additionally or alternatively to the above, the method, the device, the computer program product, the computer storage device and the system, disclosed in accordance with the presently disclosed subject matter can optionally comprise one or more of features listed above, mutatis mutandis, in any desired combination or permutation.

BRIEF DESCRIPTION OF THE DRAWINGS

In order to understand the invention and to see how it may be carried out in practice, embodiments will now be described, by way of non-limiting example only, with reference to the accompanying drawings, in which.

Figure 1:
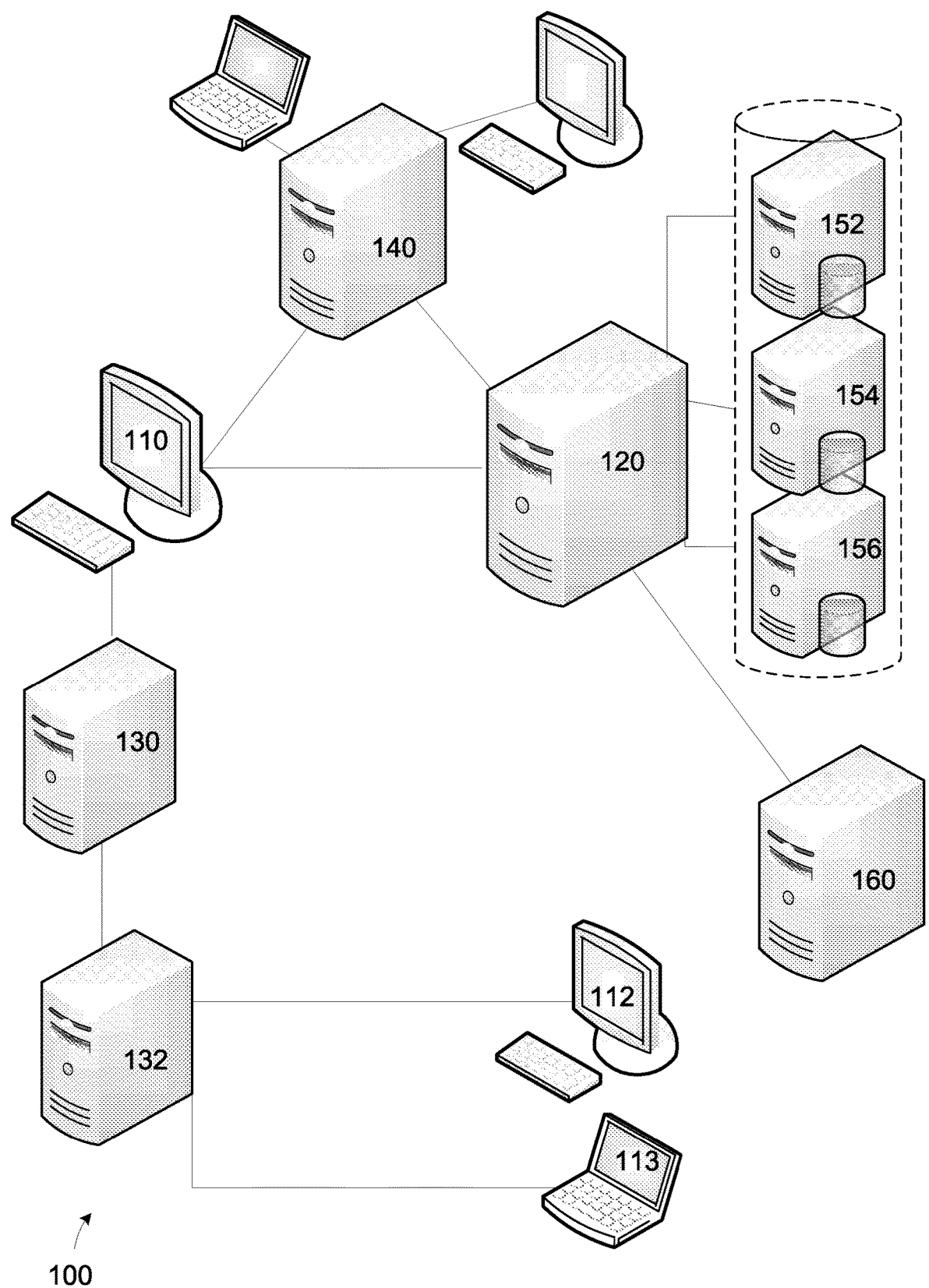
FIG. 1 is a high level functional block diagram schematically illustrating a network enabling content sharing, in accordance with the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "receiving", "obtaining", "generating" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities.

Figure 3:
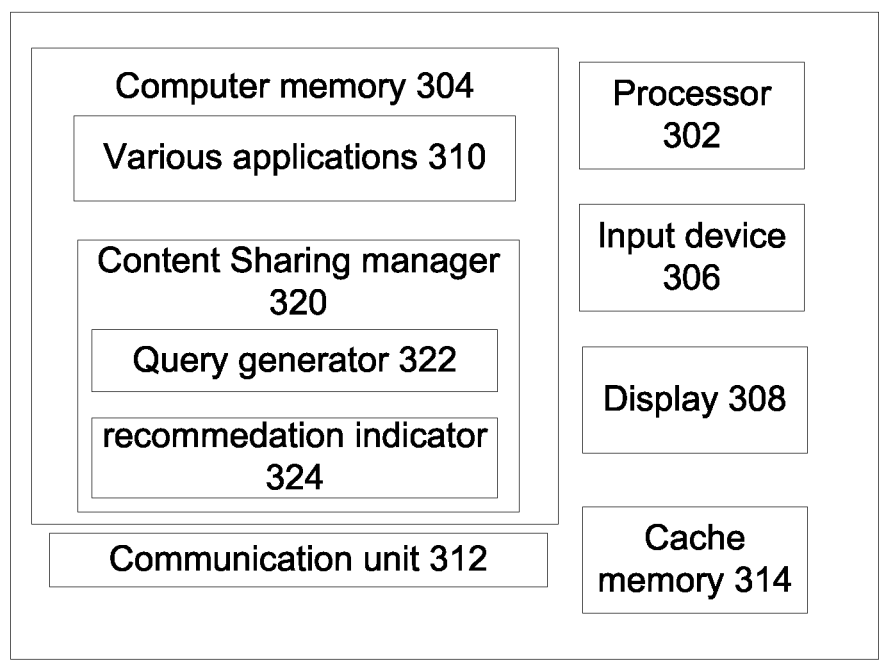
FIG. 3 is an example of a functional block diagram of a client device, in accordance with the presently disclosed subject matter.
Figure 4:
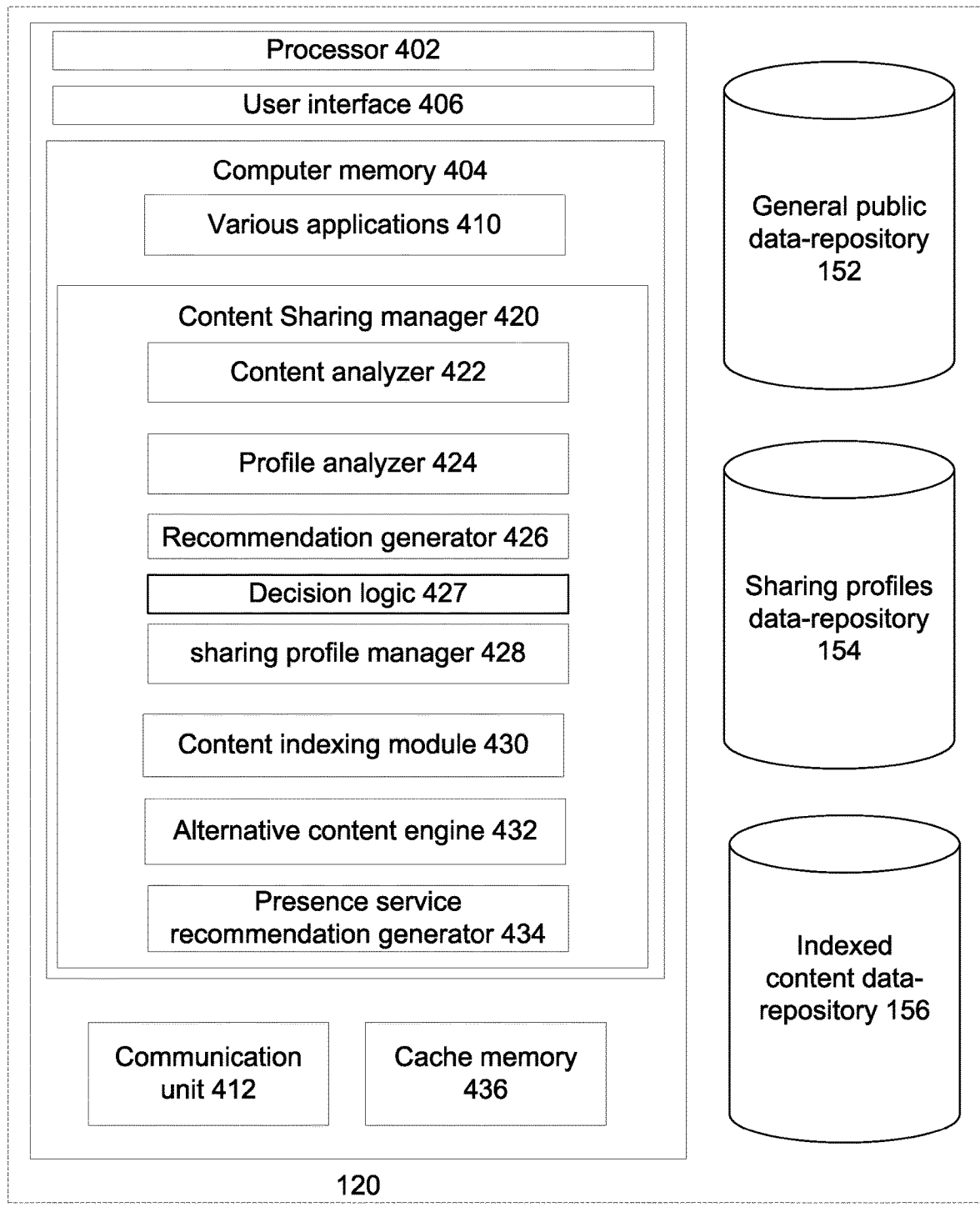
FIG. 4 is an example of a functional block diagram of a content-sharing management device, in accordance with the presently disclosed subject matter.

Client device 300 illustrated in FIG. 3 and server 120 illustrated in FIG. 4 each comprise, or otherwise are associated with a non-transitory computer memory operatively coupled to one or more processors configured to execute the operations as disclosed herein. The term processor as used herein should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a non-transitory computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 5-9 may be executed. In embodiments of the presently disclosed subject matter one or more stages illustrated in FIGS. 5-9 may be executed in a different order and/or one or more groups of stages may be executed simultaneously. FIGS. 1-4 illustrate a general schematic of the system architecture in accordance with an embodiment of the presently disclosed subject matter. The modules in FIGS. 1-4 may be centralized in one location or dispersed over more than one location. In other embodiments of the presently disclosed subject matter, the system may comprise fewer, more, and/or different modules/entities than those shown in FIGS. 1-4.

Bearing the above in mind attention is now drawn to FIG. 1 which shows a high level functional scheme illustrating a network enabling content sharing management, in accordance with the presently disclosed subject matter.

Along with many advantages, the abundance of content-sharing between users of communication networks, which can be seen in recent years, has taken its toll. For example, recipients are often shared with content which does not interest them or in some cases may even be considered offensive to them. Additionally, recipients are often shared with identical or very similar content time and again. In some cases recipients are flooded with large amounts of shared content, and as a result suffer from continuous overflow of their message box (e.g. mail box), which requires constant management of incoming messages.

Accordingly, the presently disclosed subject matter includes, inter alia, a system and method which enables to add selectivity to the sharing process. When a sender indicates a desire to share content, information with respect to the suggested content item (i.e. the content item intended to be shared) and information with respect to the sharing profile of one or more respective target recipients is analyzed. Based on this analysis, a recommendation is provided as whether or not it is suggested to the sender to perform an action. For example, the recommendation can be indicative as to whether or not it is recommended to share a given content item with a given recipient.

By allowing a sender to selectively share content with specific recipients, the presently disclosed subject matter provides a number of advantages. These advantages include, for example, reducing the load on the recipient's message box (e.g. mail box); reducing load on storage in recipient's client device; reducing load on network traffic; and improving messaging service by enabling senders to share only relevant content with respective recipients.

The network architecture in FIG. 1 is a general example which demonstrates some principles of the presently disclosed subject matter. Network 100 may be any type of communication network. For example communication can be realized over any one of the following networks: the Internet, a local area network (LAN), wide area network (WAN), metropolitan area network (MAN), any type of telephone network (including for example PSTN with DSL technology) or mobile network (Including for example GSM, GPRS, CDMA etc.), or any combination thereof. Communication in the network can be realized through any suitable connection (including wired or wireless) and communication technology or standard (WiFi, 3G, LTE, etc).

Network 100 comprises client device 110 which enables a user to communicate with other client devices and server devices (referred to herein in general as "network entities") connected to the network. Client device 110 is connected over a communication network to content-sharing management server 120. Client device 110 is further connected to other client devices which are connected to same network. By way of example and for the sake of simplicity only FIG. 1 illustrates two client devices (client devices 112 and 113) which are connected to client 110 via messaging server 130 and messaging server 132. Messaging servers 130 and 132 provide any type of messaging service including, but not limited to, email service, instant messaging service, online chat service etc. Client device 110 in FIG. 1 can also communicate with a presence server 140 (for example server providing access to a social network service such as Facebook, Twitter, LinkedIn, etc.). A few examples of presence service standards are listed above in the background section.

It is noted that network 100 is a general schematic illustration and any one of the server devices can be connected to multiple client devices or other server devices. For example, connection between server 130 and server 132 may not be a direct connection and may be facilitated via one or more additional server devices. In certain messaging systems additional server devices might be interconnect servers which can inter alia, convert protocols from one messaging protocol to another messaging protocol. An example of this is an instant messaging and presence interconnect server that can convert XMPP protocol to SIP protocol.

Content-sharing management server 120 in network 100 can be operatively connectible to a number of data-repositories including: data-repository 152, data-repository 154 and data-repository 156.

Data-repository 154 is configured for storing sharing profiles of users of the sharing management services as disclosed herein. According to the presently disclosed subject matter users are associated with respective user sharing profiles. A sharing profile can include information with respect to personal information of users, the sharing preferences of users (including information explicitly provided by users and information deduced based on previous behavioral patterns of the user), and historical activity of users including information with respect to previously viewed content items and previously shared content items.

Data-repository 156 (content-indexing data-repository) is configured for obtaining content items available on the network. The content items can be classified and indexed based on the classification to enable fast and simple retrieval.

Data-repository 152 is configured for storing general public data. General public data include data which is related to the general public rather than a specific user. For example, general public data can include information with respect to public events such as, national or religious holidays (e.g. Thanksgiving, Christmas, Independence Day), sport events (e.g. the Super Bowl, the Olympics), weather forecasts, occurring catastrophes etc. Optionally general public data can be location based and configured to track the data in relation to a specific geographical location (e.g. information with respect to the Super Bowl is more relevant to residents of the USA, information with respect to a storm alert in a certain geographical area is relevant to residents of that area).

Each of data-repositories 152, 154 and 156 can be configured as integral parts of content-sharing management server 120 or configured in a separate storage unit connected over a network communication link to content-sharing management server 120. Furthermore, data-repositories 152, 154 and 156 can be configured in three different storage units (e.g. different storage servers). Alternatively, two or more of data-repositories 152, 154 and 156 can be consolidated in a single storage unit. Data-repositories 152, 154 and 156 can be implemented as designated database servers.

Clients and servers may be, but are not limited to, computers, server computers, personal computers, portable computers, Smartphones, appliances, watches, cars, televisions, tablet devices or any other computerized device configured with adequate processing power and communication facility.

It is noted that a user who is sending a message to another user connected to the same network is referred to herein as a "sender" and a user who receives a message is referred to herein as a "recipient". The terms "sender" and "recipient" as used here should be expansively interpreted to include any sender and recipient including those of the presence server otherwise known as "publisher" and "watcher", respectively.

A user of client device 110 can communicate with one or more other client devices and/or server devices and share content with user of these devices. For example, a user of client device 110 can create a new email addressed to another user (e.g. user of client 112) and attach some type of content item to this email. The attached content can be of any type, including but not limited to, images, documents, videos, etc. Alternatively or additionally a user of client device 110 can share content via a presence server 140. For example a user publishes a message request to server 140 requesting to share content with a group from his social graph via a social network service (e.g. Facebook group).

Content-sharing management server 120 is configured to obtain from client 110, information indicative of a content item which a sender wishes to share (via client 110) as well as information indicative of one or more target recipients of the content item. As explained in more detail below content-sharing management server 120 is configured to analyze the suggested content item and obtain information indicative of a classification of the suggested content item according to different predefined characteristics. For example classification can be based on the subject matters and categories the content belongs to, the file type of content item (e.g. whether it is an image, an Internet link, a video, etc.), the sub-category of the content item (e.g. in case of video, whether it is a music video, a homemade video, an episode of a movie, TV show, a movie preview, etc.), its size, its file format, etc. Content-sharing management server 120 is also configured to obtain information with respect to the sharing profiles of the target recipients.

Content-sharing management server 120 is further configured to generate a recommendation, based on the classification of the suggested content item and the sharing profile of the target recipients, suggesting whether or not it is advisable to perform an action, e.g. whether or not to proceed with the sharing process.

Turning to FIG. 3, which is an example of a functional block diagram of a client device, in accordance with the presently disclosed subject matter. Client device 300 is an example of a configuration of functional elements in a client device in network 100 (e.g. client 110 or 111) as disclosed herein. Client device 300 comprises one or more processors 302 and a computer memory 304 (including non-transitory computer memory and possibly also transitory computer memory). Client device 300 further includes a display device 306 (e.g. LCD or LED screen) and input device 308 (e.g. keyboard mouse, touch pad, touch screen, or the like) and a communicating unit 312 facilitating the communication of the device with respective communication networks (e.g. LAN, Internet, cellular network, etc).

Computer memory 304 can include various computer programs 310 including by way of example, an operating system (e.g. Windows, Linux, Android, iOS etc.); an authoring application (e.g. MS Word editor, OpenOffice, etc.); an instant messaging application including mobile instant messaging (e.g. Skype, Gmail instant messaging service, etc.); one or more client applications; and an Internet browsing application (e.g. Google Chrome, Microsoft Explorer, Mozzila Firefox, etc.).

According to the presently disclosed subject matter client device 300 further comprises (optionally in computer memory 304) content sharing handler 320 configured in general to manage content sharing which is performed by the client. Content sharing handler 320 comprises query generator 322 and recommendation indicator 324.

Query generator 322 is configured to identify a request of a sender of client device 300 to share content with a different user connected to the same network and obtain information indicative of one or more content items which the sender of client 300 wishes to share (the suggested content), as well as information indicative of one or more network entities which are indicated by the user as the target recipients of the suggested content. Query generator 322 is further configured to send this information to content-sharing management server 120.

Recommendation indicator 324 is configured to receive a recommendation from content-sharing management server 120, and provide the recommendation to the user for example by presenting some type of indication on the display 308. Different methods of providing a recommendation to the user of client device 300 are described below.

FIG. 4 is a functional block diagram schematically illustrating a content-sharing management server, in accordance with the presently disclosed subject matter. FIG. 4 is one non-limiting example of a configuration of functional elements in content-sharing management server 120 for providing the content sharing management functionalities disclosed herein.

Content-sharing management server 120 can comprise one or more processors 402, computer memory 404 and a communication unit 412. Content-sharing management server 120 can further comprise a user interface (including for example a keyboard, mouse and screen). Computer memory 404 can include various applications (Including for example operating system, browser, server application etc.).

According to the presently disclosed subject matter, content-sharing management server 120 comprises content sharing manager 420 configured in general to receive from a client, information indicative of a desire of a user to share content with one or more other users, obtain information indicative of one or more suggested content items as well as a list of one or more target recipients (users to which the suggested content is being addressed) of the suggested content.

Content analyzer 422 is configured to analyze the content received from the client and provide information classifying the one or more content items. Profile analyzer 424 is configured to obtain the sharing profiles of respective target recipients and determine the sharing preferences based on the information in the sharing profiles. Recommendation generator 426 is configured to generate a recommendation as to whether or not it is recommended to the sender to perform an action. For example, the recommendation can be indicative as to whether or not it is recommended to share a given content item with a given recipient based on the information provided by content analyzer and profile analyzer.

As explained in more detail below, the generated recommendation can be sent back to the sender where the recommendation is utilized in order to determine how to proceed with the sharing process. In other cases the recommendation can be sent to another entity (e.g. another server) in the network where it is used for different purposes such as controlling the sharing process and generating large distribution emails.

Content-sharing management server 120 can further comprise or be otherwise connected to sharing profiles data-repository 154 designated for storing sharing profiles. In some cases, sharing profiles can be generated by profile manager 428 while in other cases the profiles can be generated by other network entities (e.g. a dedicated server) and made available for the user of content-sharing management server 120.

In case sharing profiles are generated by content-sharing management server 12, content-sharing management server 120, can further comprise sharing profile manager 428 configured to generate, update and manage users' sharing profile stored in data-repository 154. Alternatively, the functionalities of profile manager 428 can be provided in a different network entity configured for generating sharing profiles.

User sharing profiles can be generated based on information gathered from different sources including information explicitly provided by the user and information which is inferred based on previous sharing and browsing experience of the user.

For example, information with respect to a user's sharing profile can include (but is not limited to) one or more of the following:

content previously consumed by the user (e.g. previously consumed content such as video clips, music, pictures, books, and online articles); content to which the user responded (e.g. posted a comment, posted a like or dislike indication, etc.); Communication in relation to content (e.g. conversation between two users about a certain article); content shared by the user; sharing preferences of the user; specific content or content category that the user indicated as interesting; fields of interest which were explicitly indicated as interesting by the user; content downloaded by the user (e.g. downloaded apps.); user's subscriptions to content services (e.g. Financial Times); personal information (age/gender/marital status/residential location); user's online purchase history; online Ads clicked by the user; current location; current and previous list of devices used by the user; parameters related to the device and its status (OS version; list of applications installed on the device their versions and configurations; list of content stored on the device; battery level; network type and strength; free memory, display characteristics etc.) the online services the user is a paying user of; online services the user is registered to; language preferences and settings; personal profile such as gender; marital status; nationality; occupation; economic status; club memberships; hometown and date of birth; purchase history (e.g. MP3 downloaded songs); ads consumed; contact list and social graph of the user and sharing profile of other members of the social graph; events that occurred and are recorded in the sharing profile (e.g. a user rented a house, purchased a new car, a user entered into a relationship, a user checked-in at a venue, etc.); any event that changes user's interest in any content category; data consuming patterns (e.g. whether the user is in the habit of repeatedly consuming the same content or not).

Content-sharing management server 120 can be accessible to clients that wish to use the content sharing management services which are provided by the server. Optionally a client can access content-sharing management server 120 (e.g. via a web application running on a web server) and signup to the service. During the signup process a questionnaire can be presented to the user for obtaining data regarding personal information of the user and specific sharing preferences of the user. The information which is provided by the user can serve as the basic sharing profile of the user and can be further enhanced based on the sharing and browsing experience of the user which is recorded later on.

As mentioned above content-sharing management server 120 can further comprise or be otherwise connected to content-indexing data-repository 156 designated for storing indexed content items. In some cases the indexing of the content item can be performed by content-sharing management server 120 while in other cases the profiles can be generated by other network entities (e.g. a dedicated server) and made available to content-sharing management server 120.

In case indexing is performed by content-sharing management server 120, content-sharing management server 120, can further comprise content indexing module 430 which is configured to analyze content items and classify the content items based on different characteristics of the content item and index the content items based on this classification. Alternatively, the functionalities of profile indexing module 430 can be provided in a different network entity (associated with content indexing data-repository 156) configured for indexing content items available at the network.

Content indexing module 430 can be configured to obtain content items (e.g. by crawling through the Internet) and classify and index the retrieved content items. To this end content indexing module 430 can be configured to run a content indexing application. One example of such an application is the OneCalais system. News related content items are analyzed by Natural Language Processing (NLP), text analytics and data mining technologies enabling to derive meaning from unstructured information, including news articles, blog posts and research reports. Each content item is categorized using IPTC (International Press Telecommunications Council) and other methods. (For instance, if a story compares the racing performance of Ferraris vs. Porsches, it will suggest auto racing, motorsport and sports cars). The classified content is then stored in content indexing data-repository 154.

As mentioned above, content-sharing management server 120, can further comprise or be otherwise connected to content-indexing data-repository 152 designated for storing public data.

Figure 5:
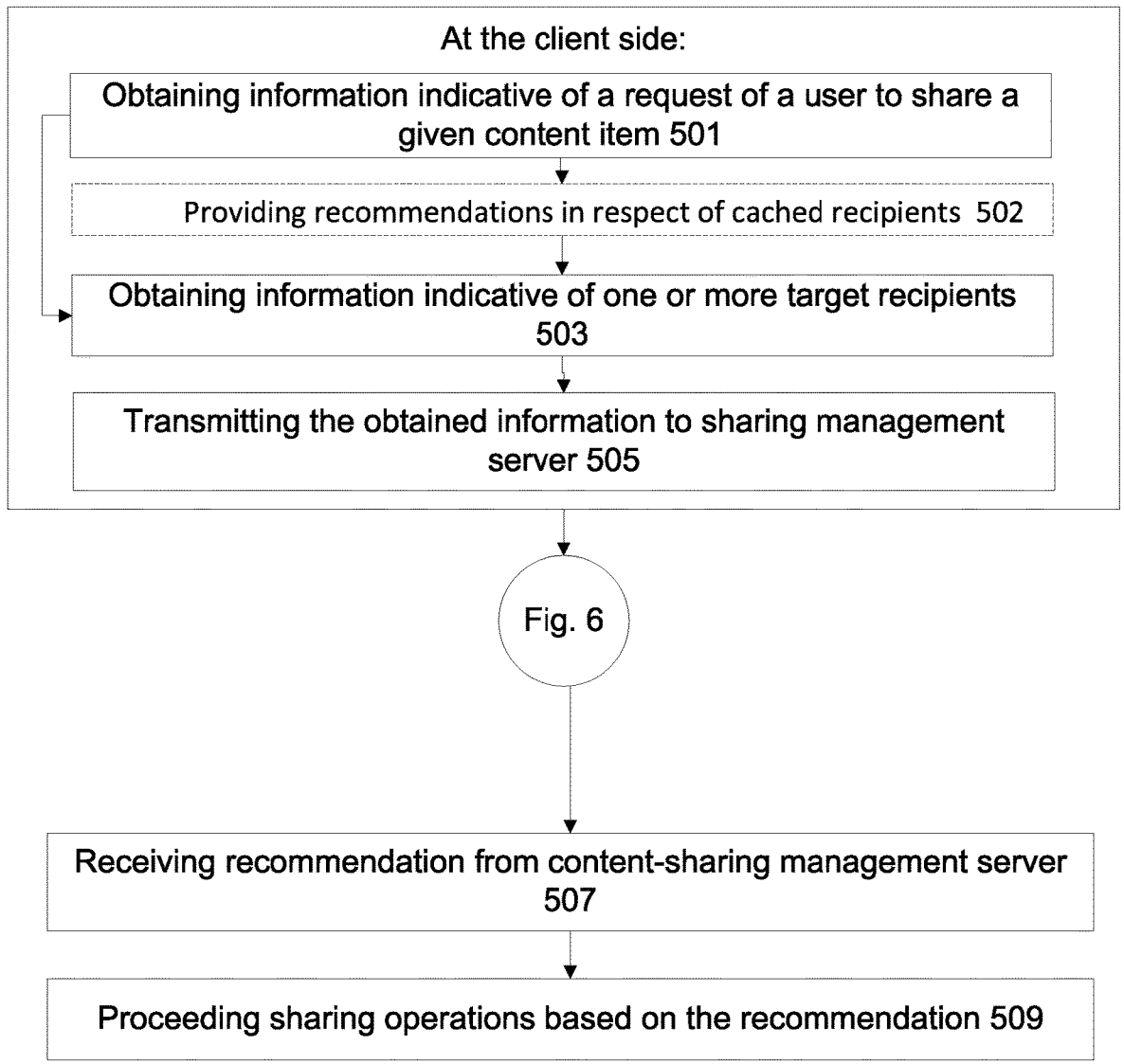
FIG. 5 is a flowchart exemplifying operations which are carried out at the client side, in accordance with presently disclosed subject matter.

FIG. 5 is a flowchart exemplifying operations which are carried out at the client side, in accordance with the presently disclosed subject matter. Operations described with reference to FIG. 3 can be performed for example by client device 300.

Consider for example, a user (sender) of client device 110 (which is configured with the functionalities of client 300) wished to share a content item with client 112 in network 100. As explained above network 100 can be a network of any type and running any type of communication application and/or messaging service (e.g. email, instant messaging service, online chat etc.).

Assuming for the sake of example only that client 110 and client 112 are connected in network 100 via an email service, server 130 being a first email server (e.g. Gmail email server) connected to client 110 and server 132 being a second email server (e.g. Yahoo email server) connected to email server 130 and to client 112.

The sender at client 110 creates a new email and attaches one or more suggested content items to the email. The sender adds to the email one or more email addresses of the target recipients to which he wishes to send the email. The client (e.g. with the help of Query generator 322) identifies that the sender wishes to share a given content item with the specified email recipients (blocks 501 and 503).

Optionally, client device can comprise cache memory 314 for storing the sharing profiles of a selected group of previously addressed target recipients and can be configured for providing recommendations with respect to cached recipients (block 502). A more detailed description of the operations related to block 502 is described below with reference to FIG. 8.

Information indicative of the one or more suggested content items and of one or more target recipients is transmitted from the client to content-sharing management server 120 (block 505).

Figure 6:
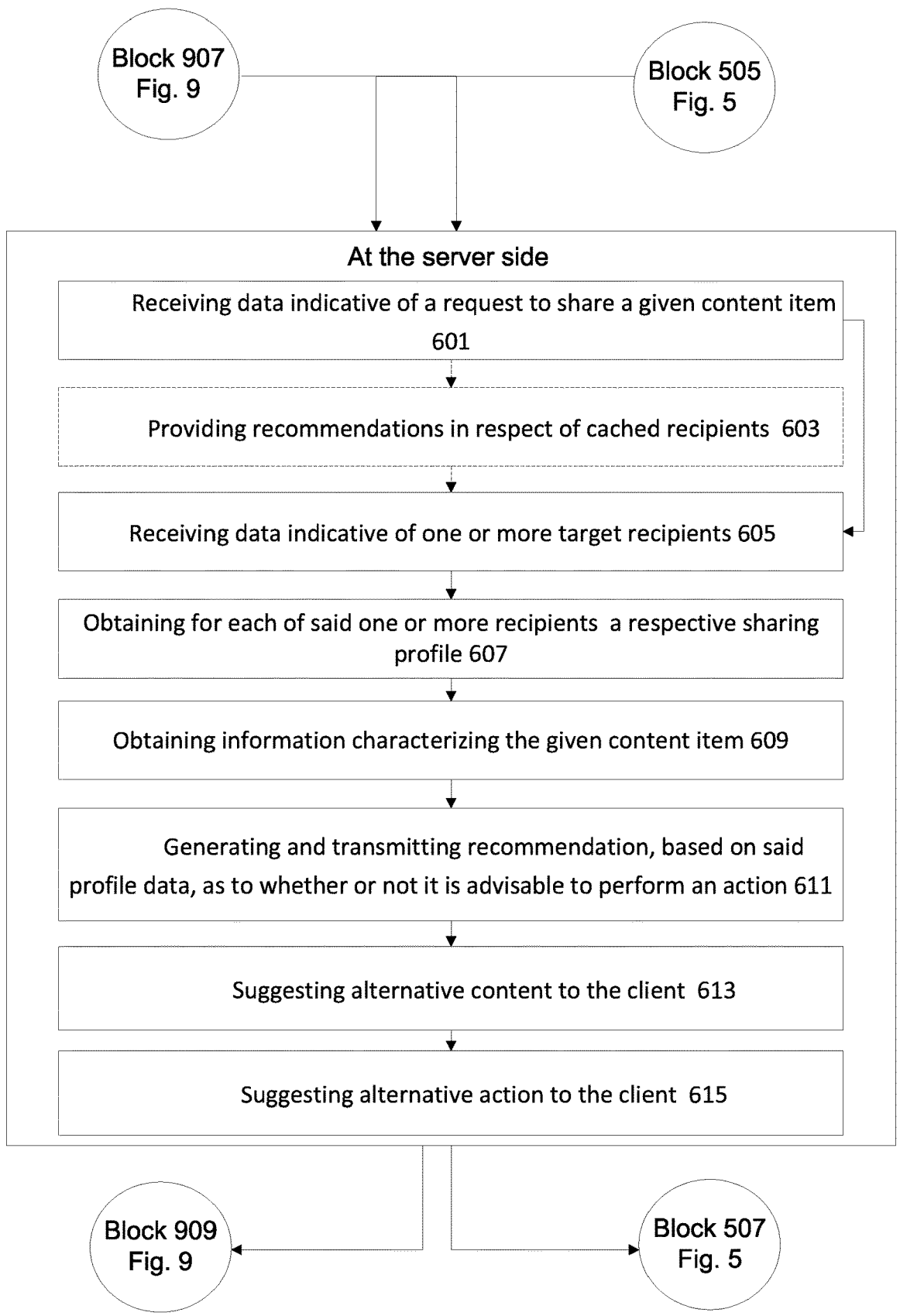
FIG. 6 is a flowchart exemplifying operations which are carried out at the server side, in accordance with presently disclosed subject matter.

Proceeding to FIG. 6 which is a flowchart exemplifying operations which are carried out at the server side, in accordance with presently disclosed subject matter. Operations described with reference to FIG. 6 can be performed for example by content-sharing management server 120 (e.g. integrated in server 120).

Information indicative of a request of a sender operating a client device, to share one or more content items with one or more other users of the network, is received by content-sharing management server 120 (block 601). Content-sharing management server 120 also receives data indicative of one or more target recipients to which the shared content is addressed (block 605).

Optionally, content-sharing management server 120 can comprise cache memory 436 for storing the sharing profile of a selected group of previously addressed target recipients and can be configured for providing recommendations with respect to cached recipients (block 603). A more detailed description of the operations related to block 603 is described below with reference to FIG. 7.

For each of the one or more target recipients a respective sharing profile is obtained (block 607). As mentioned above this information can be retrieved for example, from a sharing profile data-repository 154 designated for storing sharing profiles of different users. Additionally or alternatively, if for example, the sharing profile data-repository is not available or if there are target recipients that do not have a sharing profile, in the sharing profile data-repository, content-sharing management server can be configured to provide a recommendation based on the analysis of general information with respect to the recipients which are available. For example, the recipient's social graph (e.g. what would be the averaged relevancy to the aggregated friends of the recipient) and/or information related to the user (such as age and gender) and/or general public information obtained from general public data-repository 152, which as mentioned above can be location based (e.g. if the recipient is a US resident it is more likely that he is interested in the Super Bowl).

For each of the content items intended to be shared, information characterizing the content items is obtained (block 609). As further mentioned above, this information can be retrieved for example, from an indexing data-repository 154 designated for indexing content items according to their respective characteristics. Alternatively, in case a given content item is not found in data-repository 156, content-sharing management server 120 can be configured to analyze the content and classify the content item based on one or more characteristics of the content item or send a request to a another network entity connected to the network, which is configured for performing this analysis.

Once a sharing profile of a target recipient and the classification of a suggested content item, intended to be shared with this target recipient, are available, a recommendation is generated as to whether or not it is advisable to perform an action, such as share the given content with the target recipient (block 611). The generated recommendation is sent to respective client device. The recommendation is generated based on decision logic (427) made available to recommendation generator.

The decision rules for determining a recommendation to a given recipient can be determined as general decision rules applicable to all users in the same way. Alternatively, some or all of the decision rules can be specifically adapted for each respective user as part of a user's sharing profile. Thus, in case multiple target recipients are provided by the user, a recommendation can be provided with respect to each user individually. Alternatively, as exemplified below one comprehensive recommendation with respect to part or all target recipients can be generated based on the predefined decision logic. In case multiple content items are suggested by the sender, a recommendation can be provided with respect to each content item individually.

The following non-limiting examples show a number of possible recommendation scenarios. We may assume that a sharing profile of a target recipient indicates that the respective recipient is interested in sports in general and especially in boxing and running and that the recipient has recently viewed a number of videos showing a certain boxer. In addition, the recipient's sharing profile indicates that he dislikes politics and also provides a list of the articles the recipient has viewed in the last month.

In case the suggested content item is related to boxing and/or running, the recommendation generated by the content sharing server would be that the suggested content can be shared with the recipient (i.e. positive recommendation).

In case the suggested content item is related to politics or it is a content item which the recipient has already seen, the recommendation generated by the content sharing server would be that the suggested content should not be shared with the recipient (i.e. negative recommendation).

In another example, in case the sharing profile of a user indicates that a user finds certain types of content offensive (e.g. nudity) and the suggested content is classified to such type of content, a negative recommendation would be issued.

Furthermore, the recommendation is not necessarily limited to either a positive or negative recommendation and can be presented as a scale or score (e.g. relevancy score) indicating the level of relevancy of a given content item to a given recipient. For example, a score ranging from 0 to 10 can be used where a score of 0 indicates no relevancy and a score of 10 indicates the highest relevancy. The level of relevancy indicates the likelihood that a given recipient would be pleased to receive a given content item.

Thus, reverting to the above example, in case the shared content item is related to the specific boxer in which a target recipient showed interest (e.g. by an indication in the sharing profile that the target recipient recently watched a number of video clips showing that boxer or visited his website), the recommendation generated by the content sharing server would have a greater relevancy score than cases where the content item is related to boxing in general.

Optionally, the recommendation which is provided in block 611 is a partial recommendation which requires further processing by a respective client device in order to determine whether or not it is advisable to share the suggested content with a respective recipient. This can be advantageous for example, in order to reduce the processing power which is consumed by server 120, and therefore part of the processing related to generating the recommendation is performed by client 300 rather than content-sharing management server 120.

In addition, in some cases, additional sources of information, to those accessible to content-sharing management server 120, are considered in order to finalize a recommendation. For example, such sources can include presence information received from server 140, communication currently being conducted by the sender, sender's device characteristics such as current battery status and network reception (e.g. content to be shared is a large file while network reception is poor), calendar integration (e.g. sender is about to send an invitation to a past event).

To this end content sharing handler 320 can be configured to process the information ("initial recommendation") received from content-sharing management server 120, obtain the additional information and to provide a final recommendation based on the additional client processing as described above. For example, in case a positive recommendation was received at the sender's Smartphone to share a given content item, client device 300 (in this example the Smartphone device) can be configured to first check the battery status. Only if the battery is loaded up to a level which is greater than a certain predefined threshold, the final recommendation is positive.

Both initial recommendations and final recommendations are not necessarily limited to one parameter and can be represented by an array of parameters (e.g. an article wished to be shared with a specific recipient might get scores for the area of interest and the amount of previous unread articles the recipient has already received and a real-time score suggesting another sender is about to share the same or similar article with the specific recipient). In another case, the sender client has logic that if the real-time score indicates that a different sender is about to share a similar content, the sender client device will attempt to revalidate the real-time score with the sender after a short time period (e.g. 10 seconds) to reevaluate the sharing relevancy. In such cases, the relevancy to the sender may change accordingly.

Furthermore, in some instances client device 300 (e.g. client 110 in network 100) can provide the recommendation to the sender without communicating with other network entities. In such cases the recommendation can be based solely on information obtained from different applications installed on client device 300. For example, a sender wishes to send a message to a recipient which consists of a calendar invitation to schedule a meeting at a suggested time. Content handler 320 can be configured to obtain information from a calendar application installed on the same device (300), and to search for existing meetings. Assuming that content handler 320 finds that meeting with the same recipients is already scheduled 3 hours before the suggested time of new meeting, content handler 320 can be configured to generate a recommendation alerting the sender that a meeting with the recipient has already been scheduled.

The process described above with reference to FIG. 5 and FIG. 6 can be executed as an ongoing process in which each time additional information with respect to a target recipient is obtained (block 503), this information is transmitted to content-sharing management server 120 (block 505) and a respective recommendation is generated and returned to the client (block 611). Thus, as the sender adds recipient identities to a message (e.g. email), each added identity is sent to content-sharing management server 120, which provides a recommendation with respect to the added recipient and the sharing recommendations are provided to the client as the recipients' identities are being added.

When a sender removes or adds a recipient from the target recipients list (e.g. remove a recipient's email address from the email), a comprehensive score, provided with respect to the relevancy of all recipients, may change. If client device 300 is provided with information with respect to the individual score of each of the recipients in the list, the client device can be configured to calculate (e.g. with the help of content sharing handler 320) an updated sharing score. For example, the client device can be configured to cache the individual recommendations (e.g. scores) provided by content-sharing management server 120 with respect to recently shared recipients and use the cached scores to update the score in case a recipient's identity is removed. If the client device does not have information with respect to the individual score of each of the recipients in the list, client device can be configured to send a new request to content-sharing management server 120 for an updated score.

Similarly, a sender can remove or add content items from or to a message. If the client device is provided with information with respect to the score of suggested content item, the client device can be configured to calculate an updated sharing score (e.g. with the help of content sharing handler 320). For example, the client device can be configured to cache the recommendations (e.g. scores) provided by content-sharing management server 120 with respect to recently shared content items. If the client device does not have information with respect to the individual score of content items, client device can be configured to send a new request to content-sharing management server 120 for an updated score.

Optionally, alternative content (e.g. with the help of alternative content engine 432) which is more suitable for the target recipients than the content originated by the sender can be provided to the client (block 613). For example, in case a sender is attempting to share a certain link of a news article with a recipient and it is determined that the recipient does not have access to that news publisher's resource (e.g. registration is required), content-sharing management server 120 (e.g. with the help of alternative content engine 432) can be configured to suggest other news publishers which distribute the same (or similar) articles and are accessible to the target recipient.

For example, sender A is a paying registered user of Washington Post and uses its iPhone app while recipient B is a paying registered user of New York Times and uses its iPhone app and recipient C is not a paying user of any of these online newspapers. However, recipient C frequently uses a free online newspaper. The specific news article sender A desires to share appears in many online and paid newspapers. Content-sharing management server 120 can be configured, responsive to receiving data indicative of a request of sender A to share an article from Washington Post article with recipients B and C, to suggest different alternative content to each of the recipients according to their most relevant newspaper and send this recommendation to client 300. In the message to recipient B the article will be modified to an equivalent article from New York Times and in the message to recipient C the article will be modified to an equivalent article from a free only news publisher.

One information service that is capable of matching information news is Google News which associates similar articles from several different sources. Such a service can enable content-sharing management server 120 to match a preferred source for a given recipient based on her sharing profile.

Thus, in some cases, similar (but not identical) alternative contents can be suggested by the server 120 for different recipients. In the scenario exemplified above, responsive to receiving a recommendation from content-sharing management server 120, client 300 can be configured to split the original message to multiple different messages based on the content suggested for each recipient or group of recipients.

Furthermore, according to the presently disclosed subject matter, in case content-sharing management server 120 provides a negative recommendation (e.g. because a given target recipient has already read and/or watched and/or listened to a suggested content item), content-sharing management server 120 can identify a different resource related to the same theme of the suggested content item and suggest this resource as an alternative content for the given recipient.

Further optionally, a recommendation with respect to alternative actions (e.g. with the help of recommendation generator 426) instead or in addition to sharing the suggested content item can be provided to the client (block 615). Accordingly, when a sender wishes to share a certain content item with a given recipient, server 120 can be configured to determine an alternative action. Alternative actions include, but are not limited to, communicating with the recipient via an alternative or additional communication pathway, joining an ongoing conversation with the client, purchasing a certain product or service, downloading an application that is used by the recipient and so forth.

For example, assuming sender A is attempting to share an article with recipient C, content-sharing management server 120 can provide data to sender A indicating that recipient C has already read this article and is currently discussing the article with sender B. Content-sharing management server 120 can provide a suggestion to sender A to join the on-going conversation (e.g. joining through a certain chat application) with sender B and recipient C. Content-sharing management server 120 can also suggest the sender to download this particular chat application which is used by users B and C prior to the suggestion to join the conversation, in case sender A does not have this application installed.

A similar scenario can take place in a social networking service (e.g. on a Facebook wall) where users discuss a certain article. In such cases, sender A may receive an indication, responsive to receiving data indicative of a request of sender A to share a certain content item, to comment on an ongoing Facebook discussion with respect to that content item (e.g. article or movie) in addition to or instead of a recommendation as whether or not to share the same content item.

In some cases the generated recommendation can be sent back to the client who issued the query (block 507 in FIG. 5). At block 507 in FIG. 5 the recommendation is received at the client device (e.g. by content sharing handler 320) which can be configured to provide an indication to the user of the issued recommendation. The sharing and/or alternative operations proceed, at the client device, based on the received recommendation (block 509).

The client device can be configured in various ways for providing the recommendation received from the content sharing management server to the sender (e.g. with the help of recommendation indicator 324). In some cases responsive to a positive recommendation the sharing process continues automatically without interference of the sender. For example, in one case of an email message, the email is sent automatically immediately after the recommendation is received at the client device. In other cases, once a positive recommendation is received at the client device, a confirmation to send the email is requested from the sender before the email is sent.

In some cases client device can be configured to abort the sharing process in case a negative recommendation is received from content sharing server (e.g. in case the correlated relevancy between the suggested content and the respective target recipient is lower than a certain threshold).

Alternatively or additionally, the client device can alert the sender in various ways when a recommendation is received from content-sharing management server 120. For example an indicator or icon can be presented next to the recipient's name (e.g. in the email) indicating that the respective recipient has received a positive or a negative recommendation. Alternatively or additionally the sender can be alerted by coloring the recipients' name in different colors (e.g. green color for a positive recommendation, red color for a negative recommendation and yellow color for a mediocre recommendation).

In case the sender wishes to share a given content with multiple target recipients, recommendation indicator 324 in content sharing management device can be configured to provide multiple recommendations, each directed to a specific target recipient. For example, the name of each recipient can be marked or colored according to the specific recommendation generated for the respective recipient.

Alternatively or additionally, a comprehensive recommendation for the entire email can be generated based on the relevance of the suggested content item to all target recipients. For example, a recommendation can be generated to each of the target recipients and a positive recommendation to the entire email is provided only if 50% or more of the target recipients received a positive recommendation or in case all target recipients who are designated as close friends of the sender received a positive recommendation.

It is noted that the examples provided herein with respect to providing sharing recommendation to senders should not be construed as limiting in any way and other ways for responding to a recommendation are considered within the scope of the presently disclosed subject matter.

As mentioned above client device 110 in FIG. 1 can also communicate with a presence server 140 providing access for example to a social network service such as Facebook, Twitter, Google+, LinkedIn, etc. Generally speaking, a presence server is able to receive and manage presence information which can include inter alia, a status indicator that conveys ability and willingness of a potential communication partner. Information obtained from a presence service is referred to herein in general as "presence information".

When referring to communication over a presence server, a number of alternative terms are typically used. A sender that sends a presence message is referred to as a "publisher"; a recipient that receives the presence message is referred to as a watcher; the act of sending a presence message is referred to as publishing; the act of receiving a presence message via a pull step is referred to as fetching; and the act of receiving a presence message via a push step is referred to as notifying.

Often, users of presence servers (such as those of social networks) share content with other users of the same presence server (e.g. the same social network service). For example, social networks enable a user to post on the user's wall different types of content items which are also published to his social graph (a list of watchers). Users of social networks can also post content items directly to their friends' pages or message boards.

According to the presently disclosed subject matter, content-sharing management server 120 can operate in the context of a presence service network and provide recommendation to users who wish to share content within a presence service network (e.g. a social network).

For example, content-sharing management server 120 can be connected to (or otherwise integrated with) a presence server (140) and be configured, responsive to a request of a user of the social network to share content within the presence service network, to generate a respective recommendation based on predefined decision logic. To this end server 120 can further comprise a presence service recommendation generator 434.

For example in a social network, when a sender attempts to share content with one or more other users of the social network (e.g. running on server 140), information indicative of this attempt is transmitted from client device 110 to content-sharing management server 120. Responsive to receiving this information content-sharing management server 120 is configured to execute similar operations to those described above with reference to FIG. 6.

Some features of the decision logic which is implemented by presence service recommendation generator 434 can be specifically adapted to the characteristics of a presence service. For example, it often occurs that the same content item (e.g. link to news item or link to a funny video) is repeatedly posted by many users of a social network, each user assuming his friends (or at least most of his friends) that have not seen that content item yet. The presently disclosed subject matter can be facilitated in order to avoid these situations, (which can cause a feeling of awkwardness to the sharing user). In case a user wishes to publish a content item to be made available to his social network friends, presence service recommendation generator 434 can be configured to determine how many of the target recipients (e.g. all the user's friends in his colleagues group) have already seen this content item and if a percentage of the target recipients, which is greater than a given threshold value, were already exposed to the suggested content item, a negative recommendation is generated.

Alternatively or additionally, other criteria can be considered when the recommendation is generated. For example, the percentage of close friends (close friends can be indicated by a user in a separate list and be incorporated in his sharing profile) which already viewed the suggested content item; the percentage of friends which showed interest in the theme of the suggested content item.

According to the presently disclosed subject matter, in addition to the sharing profile, the classification of a content-item, and the public information, the recommendation can be generated based on information obtained from an external service which provides information related to a respective recipient (referred herein as "external service data"). FIG. 1 illustrates server 160 demonstrating an external service.

One instance of an external service can be presence service 140. For example, certain recommendations can be dependent on the current presence of the recipient (e.g. if the user is currently driving, the relevancy of certain textual content can be lower and a voice related content may be suggested and given a higher relevancy score).

In addition to a presence service, other external services can be utilized for providing external service data. For example, server 160 can be a device capabilities service providing information with respect to the capabilities supported by the device of a certain recipient. Such capabilities can include supported file type, front camera, screen size, touch screen, physical keyboard, screen resolution, emoji support, Adobe Flash support, JavaScript enabled, configured voicemail, max network bandwidth, max file size that can be received. Content-sharing management server 120 can be configured to use information obtained from a device capabilities service for generating the recommendation.

An example is device-dependent sharing, according to which certain types of information or files are transmitted only to specific types of client devices (e.g. an AutoCAD file could not be shared with a Smartphone but only with a desktop computer of that recipient and notify the sender in advance that this message would go to the desktop computer only).

According to another example, server 160 can provide an app store service (e.g. Android Play Store) which can provide information with respect to the application installed on a mobile device. Content-sharing management server 120 can be configured to use the additional information obtained from a device capabilities service and an app store service for generating the recommendation.

For example, server 120 can be configured to indicate to the sender in advance that a TV show he desires to share, requires that a certain application must be installed on the device of the recipient and that the minimum recommend screen size is 7 inches. If, according to the external service data provided server 160, this application is only installed on the recipient's mobile device, the generated recommendation would indicate that sharing of this TV show should be made only via his mobile device. Thus, a different recommendation to the sender can be generated for different client devices owned by the same recipient.

In yet another example, server 160 can provide information with respect to various events related to a recipient. For instance, assuming a given user publishes to his social graph (e.g. on a Facebook wall) that he is interested in having dinner near the beach and asks for suggestions from his friends of recommended venues. This information is made available to content-sharing management server 120. Content-sharing management server 120 can also obtain information (e.g. from the recipients sharing profile) indicative of the culinary preferences of the recipient (e.g. whether he is a vegetarian or meat lover, whether he is lactose intolerant or allergic to certain food types).

One or more of the user's friends (in his social graph) or anyone else who wishes to respond to the user, may provide recommendations for different restaurants located near the beach. In response to a request of a sender to send to the user (i.e. recipient) a recommendation for a restaurant (e.g. a link to relevant website) content-sharing management server can be configured to provide a recommendation whether or not the suggested 200 restaurant is relevant based on information with respect to the location of the restaurant and the food which is served there. Additional information with respect to the restaurant can also be considered, for example whether the restaurant is open or closed.

Furthermore, server 160 can provide external service timestamp indicating whether or not the recipient's request for a recommendation has been fulfilled and/or still valid. For example, if the recipient indicates that an order at some restaurant has been made (e.g. based on check in information from Facebook or order information from the credit card company obtained for example external service 160 which can be a server of a credit card company) content-sharing management server 120 can be configured to provide subsequent suggestions with lower relevancy score.

Thus, as demonstrated above, external service data with respect to a restaurant check-in or credit card transaction can be obtained from an external service in real-time and used by content-sharing management server 120 for generating a more accurate recommendation.

In the following example the recommendation is based on current interaction of a recipient with a television. A recipient who is currently watching a certain TV show is being monitored by the television device (e.g. with the help of a video camera operatively connected to the television). Assume that the recipient is interrupted by a phone call or a doorbell. When the recipient's attention is diverted to the phone call, the television device can identify that the recipient is not watching the TV show and can record information indicating which part of the show was broadcasted while the recipient was not actually watching. Content-sharing management server 120 can be configured to obtain this information from an external service (e.g. a smart television configured for monitoring the attention of a user).

When a sender indicates a desire to share a video clip which was part of that TV show, the recommendation which is generated by server 120 can change, depending on whether or not the recipient has indeed watched that part of the show or not. Moreover, the history of actions taken by the particular user, such as repeatedly watching the same clip, or ignoring it, can be also considered while the recommendation is generated and stored as part of the sharing profile.

Similarly, in another example, a computerized application directed for sending users the content related to the show they have watched (e.g. parts missed in the show) could be provided with access to content-sharing management server 120, in order to identify content which is relevant to a specific recipient (i.e. parts she missed from the show, or parts the recipient would probably want to watch again).

In a similar example, a smart TV device can be configured to monitor the viewers located in front of the device during broadcast of a certain show. Viewers can join and leave while the TV device identifies which of the viewers are located in front of the screen at any given time. At the end of the show the TV device can create a specific video clip adapted for each of viewers, each specific video aggregating the parts of the show missed by a respective viewer. The TV device runs a computer program for generating a message to each viewer, the message providing each viewer with the parts of the show that were missed by him. According to this example, the TV device is configured as a consolidation of client device 300 and server 120. The TV device is configured to generate the request to share content (provide the missing parts of the show) and to generate a recommendation as to whether or not to share, and which parts of the show to share with each recipient.

As mentioned above with reference to block 603 in FIG. 6 client device 300 and/or content sharing management server 120 can comprise a cache memory designated for storing sharing profiles of a selected group of previously addressed target recipients (herein "favorite target recipients"). This is done in order to enable the client device 300 and/or content sharing management server 120, to quickly and smoothly provide sharing recommendations with respect to the favorite target recipients in response to any indication of a desire of a user to share content. The favorite target recipients can include for example a predefined number of recently addressed recipients, a predefined number of mostly addressed target recipients, a predefined group on a social network, the social graph of the user, etc.

Assuming that it is likely that most sharing events initiated by a given sender are addressed to a limited group of recipients, by caching the sharing profile of these recipients it is possible to shorten the period of time it takes a sender to receive a recommendation and send a respective message.

Figure 7:
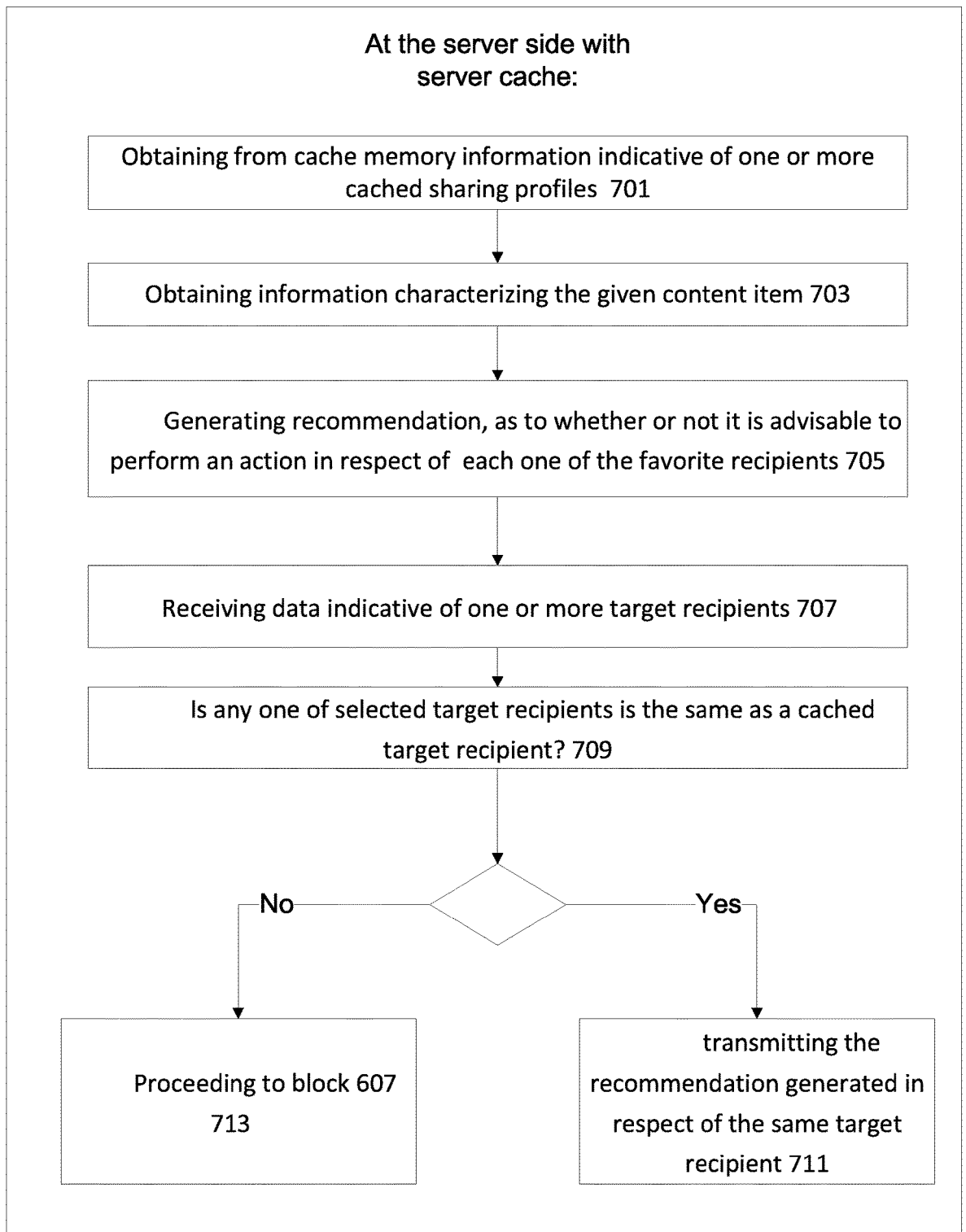
FIG. 7 is a flowchart exemplifying operations which are carried out at the server side, in accordance with the presently disclosed subject matter.

FIG. 7 is a flowchart illustrating operations carried out in accordance with the presently disclosed subject matter. FIG. 7 provides a more detailed description of block 603 in FIG. 6. Operations described with reference to FIG. 7 can be executed by content sharing management server 120 comprising cache memory 436 designated for storing sharing profiles of favorite target recipients. Responsive to obtaining information indicative of a desire of a client to share a given content item (block 601 in FIG. 6) sharing profiles of favorite target recipients are retrieved from cache memory (block 701). The cached sharing profiles of favorite target recipients enables to generate a recommendation immediately after the sender indicates a desire to share a given content item, even before information indicative of the target recipients, which are selected by the sender (herein "selected target recipients"), is provided. Accordingly, once a sender of client device indicates a request to share one or more content items (e.g. as soon as the sender starts to write a message or immediately after he presses a share button associated with a given content item), information with respect to this request is transmitted to device 440 and the cached sharing profiles are retrieved from cache memory 436 at server 120.

In some cases the cache memory can be located at the client device and in such cases the cached sharing profiles are retrieved from cache memory 314 at client device 300. As before, the retrieved one or more profiles are sent to the content sharing management server 120 immediately after the sender indicates a desire to share a given content item.

Information characterizing the suggested content item is obtained from data-repository 156 (block 703) and a recommendation is generated as whether or not it is desirable to perform an action with respect to the favorite target recipients, (e.g. such as whether or not to share the content item with the favorite target recipients) (block 705).

At block 707 information with respect to one or more selected target recipients is obtained. The target recipients selected by the sender are compared with the favorite target recipients (block 709). If any one of the selected target recipients is the same as the favorite target recipients, the recommendation generated with respect to these recipients is sent to client device 300 (block 711). If there are selected target recipients that are different than the cached favorite target recipients, the process continues to block 607 in FIG. 6 and a recommendation is generated with respect to the different recipients (block 713).

Figure 8:
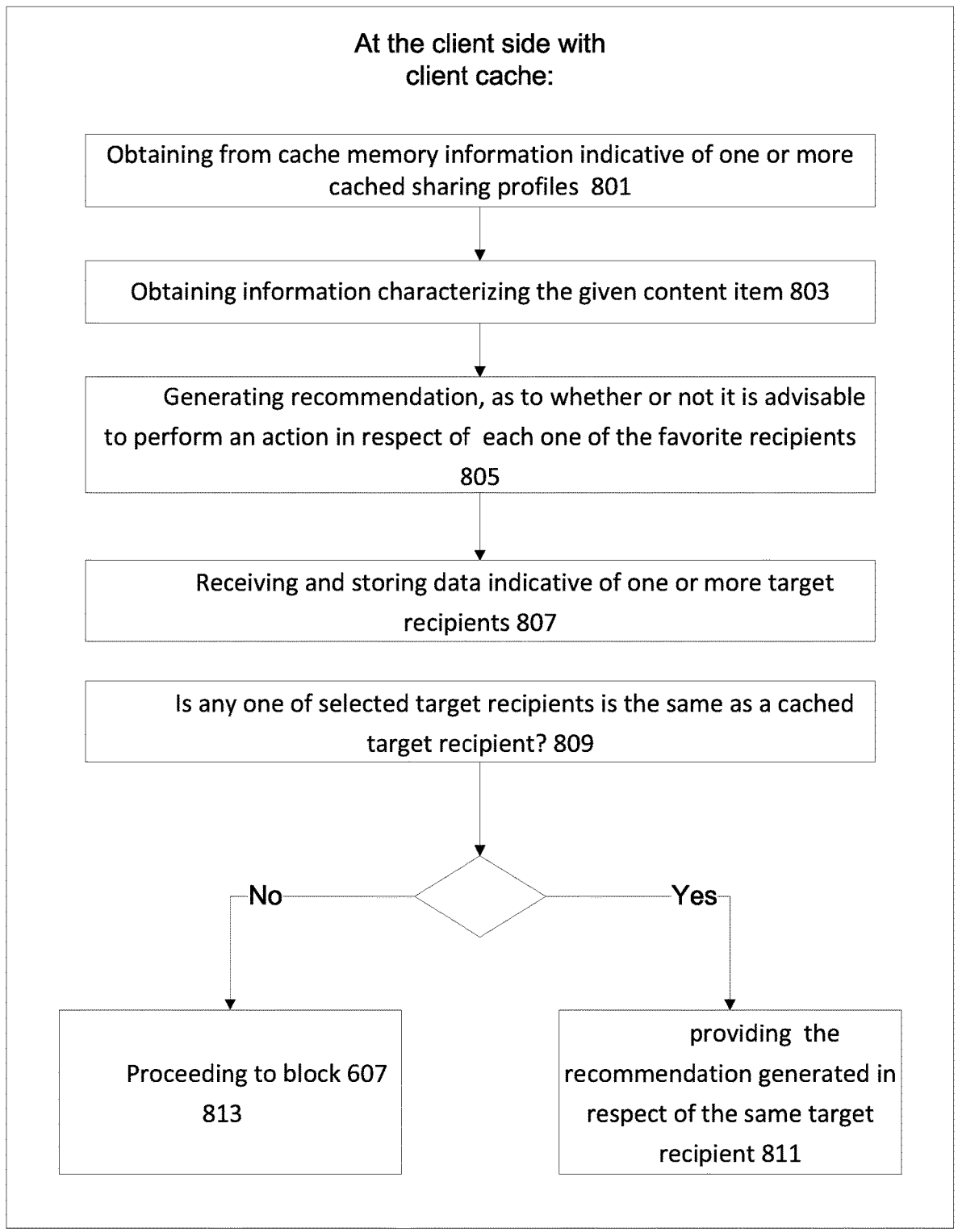
FIG. 8 is a flowchart exemplifying operations which are carried out at the client side, in accordance with the presently disclosed subject matter.

FIG. 8 is a flowchart illustrating operations carried out in accordance with the presently disclosed subject matter. FIG. 8 provides a more detailed description of block 603 in FIG. 6. Operations described with reference to FIG. 8 can be executed by client device 300 (e.g. with the help of content sharing handler 320) comprising cache memory 314. FIG. 8 is a more detailed description of the operation performed with reference to block 502 in FIG. 5 and describes a scenario where client device 300 is configured with cache memory 314 and with at least part of the functionality of server 120 related to providing recommendations.

As explained above, cache memory 314 can include one or more favorite sharing profiles. At the client device, responsive to obtaining information indicative of a desire of a client to share a given content item (block 601 in FIG. 6) sharing profiles of favorite target recipients are retrieved from the cache memory. The cached sharing profiles of favorite target recipients are retrieved from the cache immediately after a sender of the client device indicates a request to share one or more content items (e.g. as soon as the sender starts to write a message or immediately after he presses a share button associated with a given content item).

Information characterizing the suggested content item is obtained (block 803) and a recommendation is generated as whether or not to perform an action with respect to the favorite target recipients, (e.g. such as whether or not to share the content item with the favorite target recipients) (block 805). The information characterizing the suggested content item can be stored together with the profile data in cache memory. In such cases only content items which were previously shared by the respective client device can be handled.

At block 807 information with respect to one or more selected target recipients is obtained. Information with respect to the suggested content and the selected target recipients can also be sent to content-sharing management server 120 (see block 505).

The target recipients selected by the sender are compared with the favorite target recipients (block 809). If any one of the selected target recipients is the same as the favorite target recipients, the recommendation generated with respect to these recipients is provided to client device to be used for determining whether or not to share the suggested content item (block 811).

If there are selected target recipients that are different than the cached favorite target recipients, the process continues to block 607 in FIG. 6 and a recommendation is generated with respect to the different recipients (block 713) and sent to the client device.

As explained above, according to one sharing scenario, content sharing management server 120 operates as part of content sharing server 120 and is provided with access to a messaging service (e.g. an email application) which is being used in the client device. However, in some cases the content sharing management server 120 may not have access to the communication service running on the client device. For example, in case the communication service is based on a legacy system which does not support the content sharing management server 120. In such cases, content sharing management server 120 is not able to receive the required information with respect to the shared content items and the target recipients from the client device, and cannot provide the client device with respective sharing recommendations.

Thus, the presently disclosed subject matter further includes a system and method which enables to provide content management services in cases where the communication service running on the client device is not accessible to content sharing management server 120.

Figure 2:
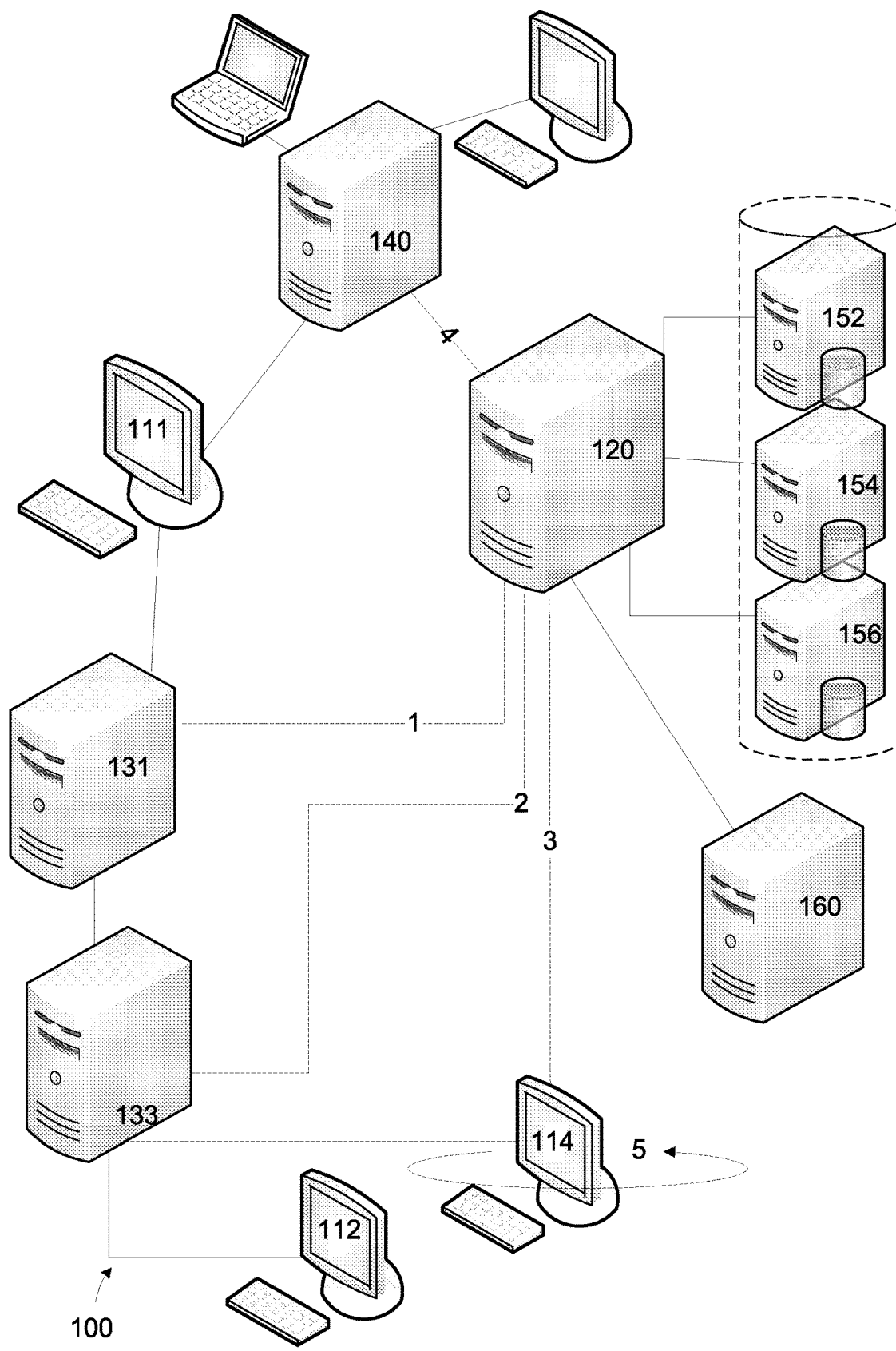
FIG. 2 is another high level functional block diagram schematically illustrating a network enabling content sharing, in accordance with the presently disclosed subject matter.

Reverting to FIG. 2 showing a high level functional block diagram schematically illustrating a network enabling content sharing management, in accordance with the presently disclosed subject matter. Unlike the network described above with reference to FIG. 1 here client device 111 (i.e. the client device operated by a sender) is not directly connected to content-sharing management server 120. Instead, content-sharing management server is shown to be connected to a first messaging server 131 (e.g. a sender related email server), a second messaging server 133 (e.g. a recipient related email server) and to target recipient clients 112 and 114. Each of these connections (indicated by broken lines 1, 2, 3 and 4 respectively) represents an optional solution for providing sharing management services when the communication services running on client device are not accessible to the sharing management server 120.

A message (e.g. an email message) which is sent from client 111 to client 112 (or client 114) is first sent to messaging server 131 which forwards the message to messaging server 133 which in turn sends the message to client 112. According to one option, content-sharing management server 120 is operatively connected to messaging server 131 which is accessible to the sharing management service provided by server 120. In this example, messaging server 131 can comprise client device 300 or a sharing management device which is configured with similar functionalities of those which were previously described with reference to client device 300.

Figure 9:
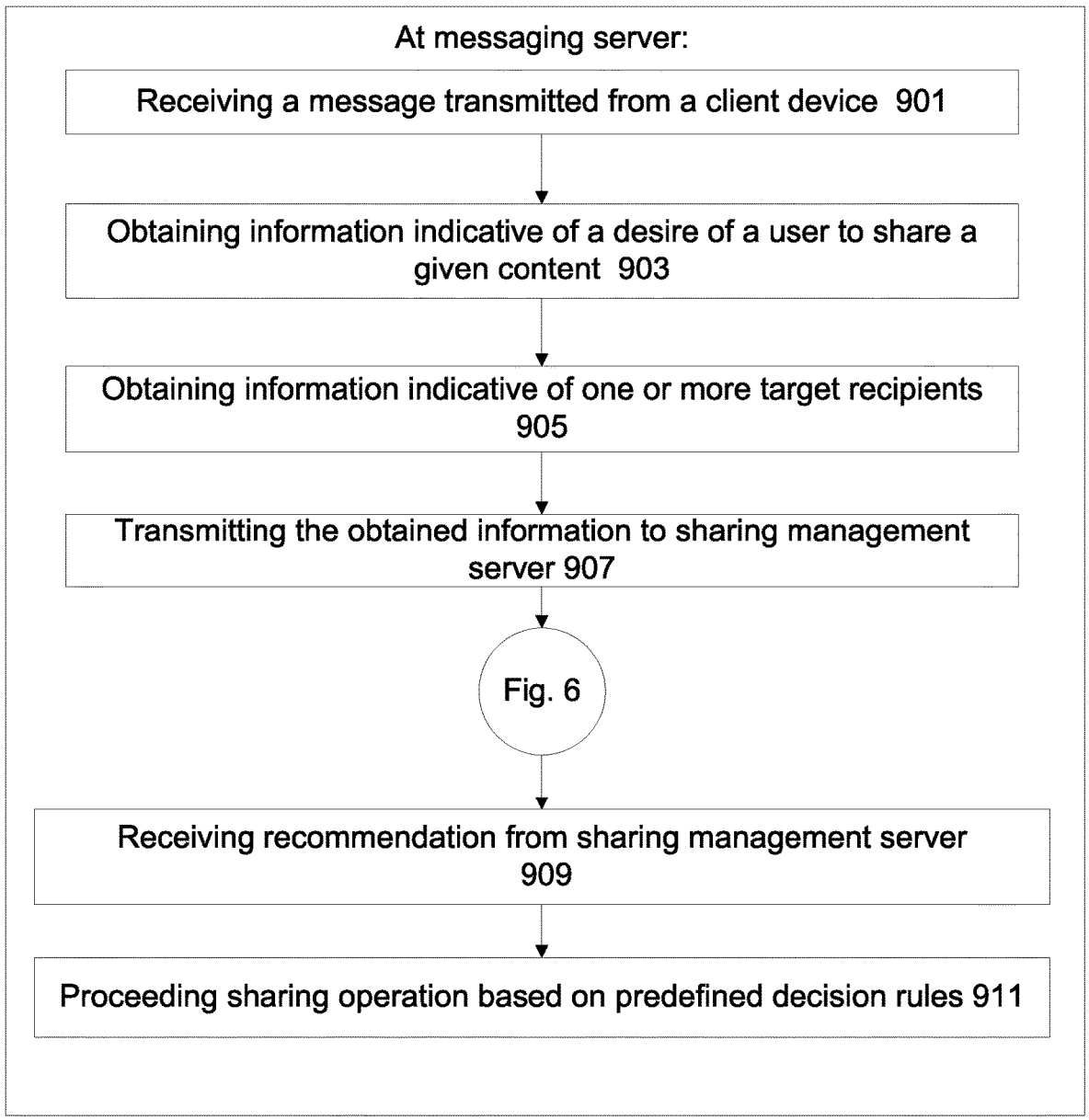
FIG. 9 is a flowchart exemplifying operations which are carried out at a messaging server, in accordance with presently disclosed subject matter.

FIG. 9 is a flowchart exemplifying operations which are carried out at a messaging server 131, in accordance with the presently disclosed subject matter. At block 901 a message (sent from client 111) is received. Responsive to receiving the message, server 131 is configured to identify a desire to share content (block 903), identify the respective content and the respective target recipients (block 905) and send this information to content sharing management sever 120. The operations executed at content sharing management server 120 are described above with reference to FIG. 6.

At block 909 a recommendation is received from sharing management server 120. Based on the recommendation and predefined decision rules, email server 131 decides how to proceed with the sharing operation (block 911). In some cases the rule set can be accessed and modified by the sender (e.g. sender of an email) via interfaces such as web or mobile applications.

For example the rule set defines whether the received message should be delivered to recipient in any case regardless of the recommendation; partially delivered (e.g. without a certain content item, or only to part of the recipients); abort message delivery; whether or not a reporting message should be sent back to the sender, etc.

In a more specific example, the rules which are assigned for the sharing operation (e.g. with the help of a sharing management device operating in server 131) can determine that in case a negative recommendation is received from content sharing management server 120, messaging server should send the message back to client 111, possibly along with a notification informing the sender of the received recommendation. The decision rules may further determine that in case the message is re-sent from client 111 to client 112 or 114 this is considered an indication to server 131 that the sender (user of client 111) wishes to share the content with the respective recipient in spite of the negative recommendation and therefore proceed and transmit the second message to its destination.

In case a message is addressed to multiple target recipients, the decision rules can also consider the recommendation which is provided to each recipient and the importance of the respective recipient (e.g. whether the recipient is a close friend or not). For example the decision rules can determine that in case the message contains multiple target recipients, two of which are identified by content sharing management server 120 as close friends and the received recommendation indicated that the suggested content is not relevant to these two close friends, the message will be aborted.

Returning to FIG. 2, according to another option, content-sharing management server 120 is operatively connected to messaging server 133 (indicated by broken line 2 in FIG. 2). In this example messaging server 133 can be configured to perform similar operations to those of messaging server 131 as described above with reference to FIG. 9.

According to a further option, content-sharing management server 120 is operatively connected to client device 114 which is accessible to the sharing management service provided by sharing management server 120 (indicated by broken line 3 in FIG. 2). In this example client device 114 can be configured to perform similar operations to those of email server 131 as described above with reference to FIG. 9.

According to another option, client device 114 is operatively connected to content-sharing management server 120. However, in this case client device 114 is configured with the functionalities of sharing management server 120 (indicated by broken line 5 in FIG. 2) and is therefore operable to generate the respective recommendation by itself. Based on the generated recommendation and the predefined decision rules, client device 114 can determine how to proceed with the sharing operation and whether or not to accept the incoming shared content.

In such cases, the connection to sharing management server 120 can be facilitated for obtaining information with respect to activity of the recipient on other devices. For example, in case the decision rules determine that the incoming message contains a content item which has already been read by the recipient, client device 114 can communicate with sharing management server 120 in order to determine whether the recipient has already read the content item via a different client device.

According to yet another option, content-sharing management server 120 is operatively connected to (or integrated within) presence server 140 (indicated by broken line 4 in FIG. 2). In this presence server 140 can be configured to perform similar operations to those of messaging server 131 as described above with reference to FIG. 9.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable non-transitory memory tangibly embodying a program of instructions executable by the machine for executing the disclosed method.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computerized method of sharing content between network entities connected over a communication network, the method comprising:
receiving, using a processor, from a given network entity, information indicative of a request to share at least one given content item with one or more selected target recipients;
obtaining, using the processor, information characterizing the at least one given content item;
obtaining, using the processor, for at least one target recipient of the one or more selected target recipients, information related to a respective sharing profile;
using the processor to process the request to share at least one given content item with one or more selected target recipients and generating a recommendation with respect to the at least one given content item, based on decision rules that utilize the information related to the respective sharing profile and the information characterizing the at least one given content item;
wherein the recommendation generated by the processor using the decision rules, is either a positive recommendation that is indicative that the at least one given content item can be shared with the at least one target recipient of the one or more selected target recipients, or is a negative recommendation that is indicative that the at least one given content item should not be shared with the at least one target recipient; and
when the recommendation is a negative recommendation:
identifying, using the processor, alternative content to be shared with the at least one recipient instead of the at least one given content item;
generating and providing an indication of the alternative content, thereby facilitating the selective sharing of content;
wherein the one or more selected target recipients include at least a first recipient and a second recipient,
wherein the recommendation comprises information indicative of one alternative content to be shared with the first recipient and information indicative of another alternative content to be shared with the second recipient, and
wherein the method further comprises generating a first message designated for the first recipient comprising the alternative content to be shared with the first recipient and a second message designated for the second recipient and comprising the other alternative content to be shared with the second recipient.

2. The computerized method of claim 1, wherein the request is generated by a second network entity connected via the network to the given network entity; the information indicative of a request to share at least one given content item is communicated from the second network entity to the given network entity.

3. The computerized method of claim 1, wherein the method further comprising:
responsive to receiving the request, obtaining at least one cached sharing profile of at least one respective target recipient from a group of one or more target recipients;
utilizing the processor for generating a recommendation with respect to the at least one given content item, based on the at least one cached sharing profile and the information characterizing the at least one given content item;
the recommendation being indicative as to whether or not to perform one or more action with respect to the at least one respective target recipient in the group; and
utilizing the recommendation, if the at least one respective target recipient from the group is identical to any one of the at least one selected target recipient.

4. The computerized method of claim 1, further comprising generating an indication as to whether or not to perform one or more actions with respect to the at least one target recipient.

5. The computerized method of claim 1, wherein the method further comprises one or more of:
obtaining external service data with respect to the at least one target recipient of the one or more selected target recipients, and utilizing the decision rules for generating the recommendation for the at least one target recipient based on the external service data; and
obtaining general information with respect to the at least one target recipient of the one or more selected recipients, and utilizing the decision rules for generating the recommendation for the at least one target recipient based on the general information in addition or instead of the information related to a respective sharing profile.

6. The computerized method of claim 1, wherein the method further comprising: automatically proceeding with the sharing of the content according to the recommendation.

7. The computerized method of claim 1, wherein the method further comprising: wherein the one or more target recipients are part of a social graph of a first user of a social network, the recommendation is indicative whether it is advisable for the first user to share a content item with at least part of the social graph.

8. The computerized method according to claim 1, wherein the decision rules utilize data related to whether or not the respective recipient has already seen the given content item.

9. The computerized method according to claim 1, wherein the recommendation includes a relevancy score that indicates the likelihood that a given recipient of the target recipients would be pleased to receive a content item.

10. A content sharing management device operatively connectible to communication network, the device comprising non-transitory computer memory operatively coupled to at least one processor configured to:
receive, from a given network entity, information indicative of a request to share at least one given content item with one or more selected target recipients;
obtain information characterizing the at least one given content item;
obtain for at least one target recipient of the one or more selected recipients information related to a respective sharing profile;

generate a recommendation with respect to the at least one given content item, based on decision rules that utilize the information related to a respective sharing profile and the information characterizing the at least one given content item;
wherein the recommendation is either a positive recommendation that is indicative that the at least one given content item should be shared with the at least one target recipient of the one or more selected target recipients, or is a negative recommendation that is indicative that the at least one given content item should not be shared with the at least one target recipient; and
when the recommendation is a negative recommendation:
identify alternative content to be shared with the at least one target recipient instead of the at least one given content item and generate an indication of the alternative content, thereby facilitating the selective sharing of content;
wherein the one or more selected target recipients include at least a first recipient and a second recipient,
wherein the recommendation comprises information indicative of one alternative content to be shared with the first recipient and information indicative of another alternative content to be shared with the second recipient, and
generate a first message designated for the first recipient comprising the alternative content to be shared with the first recipient and a second message designated for the second recipient and comprising the other alternative content to be shared with the second recipient.

11. The device according to claim 10, wherein
the request is generated by a second network entity connected to the network;
the second network entity is not operable to communicate the information with respect to the request to the content sharing management device; and
the second network entity is connected via the network to the given network entity and configured to communicate the information indicative of a request to share at least one given content item to the given network entity.

12. The device according to claim 10, wherein
the recommendation is an initial recommendation;
the at least one processor is further configured to provide the recommendation to a network entity;
the network entity is configured to obtain additional information and provide a final recommendation based on the recommendation and the additional information.

13. The device according to claim 10, wherein responsive to receiving the request the at least one processor is further configured: to
obtain at least one cached information related to a respective sharing profile of at least one respective target recipient from a group of one or more target recipients;
generate a recommendation with respect to the at least one given content item, based on the at least one cached information related to a respective sharing profile and the information characterizing the at least one given content item;
the recommendation being indicative as to whether or not to perform one or more actions with respect to the at least one respective target recipient in the group; and
utilize the recommendation, if the at least one respective target recipients from the list group is identical to any one of the at least one selected target recipient.

14. The device according to claim 10, wherein the information related to a respective sharing profile is stored at a data repository which is accessible to the device.

15. The device according to claim 10, wherein information related to a respective sharing profile is stored at a data repository which is accessible to a network entity which generated the request.

16. The device according to claim 10, wherein
the device is connected to a data source of external service data;
the at least one processor is further configured to
obtain from the data source external service data with respect to the at least one target recipient; and
to utilize the decision rules to generate the recommendation, for the at least one target recipient based on the external service data.

17. The device according to claim 10, wherein the request is generated by a computer program without the interaction of a human.

18. A system comprising a plurality of network entities connected over a communication network, the network entities comprising computer memory and at least one processor; the system comprising:
at least a first client device;
a second client device; and
a content sharing management server;
the server comprises at least one processor configured to:
receive, from the first client, information indicative of a request to share at least one given content item with the second client, the second client being a target recipient;
obtain information characterizing the at least one given content item;
obtain information related to a respective sharing profile with respect to the target recipient;
process the request to share at least one given content item with the target recipient and generate a recommendation with respect to the at least one given content item, based on utilize the decision rules to the information related to a respective sharing profile and the information characterizing the at least one given content item;
wherein the recommendation is either a positive recommendation that provides an indication to the first client that the at least one given content item should be shared with the target recipient, or is a negative recommendation that provides an indication to the first client that the at least one given content item should not be shared with the target recipient; and
when the recommendation is a negative recommendation:
identify alternative content to be shared with the target recipient instead of the at least one given content item and generate an indication of the alternative content, thereby facilitating the selective sharing of content;
wherein the one or more selected target recipients include at least a first recipient and a second recipient,
wherein the recommendation comprises information indicative of one alternative content to be shared with the first recipient and information indicative of another alternative content to be shared with the second recipient, and
generate a first message designated for the first recipient comprising the alternative content to be shared with the first recipient and a second message designated for the second recipient and comprising the other alternative content to be shared with the second recipient.

19. A non-transitory program storage device readable by machine, tangibly embodying a program of instructions executable by the machine to perform a method of sharing content between network entities connected over a communication network, the method comprising:
   receiving, from a given network entity, information indicative of a request to share at least one given content item with one or more selected target recipients;
   obtaining information characterizing the at least one given content item;
   obtaining for at least one target recipient of said one or more selected target recipients, information related to a respective sharing profile;
   processing the request to share at least one given content item with one or more selected target recipients and generating a recommendation with respect to the at least one given content item, based on decision rules that utilize the information related to the respective sharing profile and the information characterizing the at least one given content item;
   wherein the recommendation is either a positive recommendation that is indicative that the at least one given content item can be shared with the at least one target recipient of the one or more selected target recipients, or is a negative recommendation that is indicative that the at least one given content item should not be shared with the at least one target recipient: and
   when the recommendation is a negative recommendation:
   identifying alternative content to be shared with the at least one target recipient instead of the at least one given content item and generating an indication of the alternative content, thereby facilitating the selective sharing of content;
   wherein the one or more selected target recipients include at least a first recipient and a second recipient,
   wherein the recommendation comprises information indicative of one alternative content to be shared with the first recipient and information indicative of another alternative content to be shared with the second recipient, and
   generating a first message designated for the first recipient comprising the alternative content to be shared with the first recipient and a second message designated for the second recipient and comprising the other alternative content to he shared with the second recipient.

* * * * *